United States Patent
Barrera et al.

(10) Patent No.: US 12,337,752 B2
(45) Date of Patent: Jun. 24, 2025

(54) PEDESTRIAN CROSSING MANAGEMENT USING AUTONOMOUS VEHICLES

(71) Applicant: Volvo Car Corporation, Gothenburg (SE)

(72) Inventors: Oswaldo Perez Barrera, Gothenburg (SE); Gerardo Morales, Gothenburg (SE)

(73) Assignee: Volvo Car Corporation, Gothenburg (SE)

( * ) Notice: Subject to any disclaimer, the term of this patent is extended or adjusted under 35 U.S.C. 154(b) by 267 days.

(21) Appl. No.: 18/159,223

(22) Filed: Jan. 25, 2023

(65) Prior Publication Data
US 2024/0246479 A1    Jul. 25, 2024

(51) Int. Cl.
*B60Q 1/50* (2006.01)
*B60Q 5/00* (2006.01)
*B60W 30/095* (2012.01)
*B60W 60/00* (2020.01)

(52) U.S. Cl.
CPC .............. *B60Q 1/525* (2013.01); *B60Q 5/006* (2013.01); *B60W 30/0956* (2013.01); *B60W 60/001* (2020.02); *B60W 2554/4029* (2020.02); *B60W 2556/45* (2020.02)

(58) Field of Classification Search
CPC ... B60Q 1/525; B60Q 5/006; B60W 30/0956; B60W 60/001; B60W 2554/4029; B60W 2556/45
See application file for complete search history.

(56) References Cited

U.S. PATENT DOCUMENTS

| 8,258,981 | B2 | 9/2012 | Turnbull |
| 9,165,460 | B2 | 10/2015 | Aziz |
| 10,049,566 | B2 * | 8/2018 | Shanahan ........ G08G 1/096775 |
| 10,347,132 | B1 * | 7/2019 | Chandrakumar ......... B60T 7/22 |
| 10,866,589 | B2 | 12/2020 | Ewert |
| RE49,232 | E | 10/2022 | Strickland et al. |
| 2016/0049079 | A1 | 2/2016 | Ibrahim et al. |
| 2018/0162388 | A1 * | 6/2018 | You ........................ G06V 20/58 |

(Continued)

OTHER PUBLICATIONS

"SAE J3016TM Levels of Driving Automation" SAE International, https://www.sae.org/binaries/content/assets/cm/content/blog/sae-j3016-visual-chart_5.3.21.pdf, Last Accessed Mar. 28, 2023, 1 page.

(Continued)

*Primary Examiner* — Daryl C Pope
(74) *Attorney, Agent, or Firm* — Amin, Turocy & Watson, LLP

(57) ABSTRACT

Various systems and methods are presented regarding utilizing technology onboard an vehicle to minimize road traffic accidents between pedestrians and cars. The vehicle can be operating in any of an autonomous, partially autonomous, or non-autonomous manner. By utilizing on-board technology, a vehicle can detect both a pedestrian crossing a road as well as other vehicles driving on the road. The vehicle can determine a respective velocity of both the pedestrian and the other vehicle(s) in conjunction with their respective trajectories. Based thereon, the vehicle can determine whether the other vehicle is likely to hit the pedestrian. In the event of such an accident potentially occurring, the vehicle can attempt to warn the pedestrian and/or the other driver.

20 Claims, 12 Drawing Sheets

(56) References Cited

U.S. PATENT DOCUMENTS

2020/0065711 A1    2/2020  Clément et al.
2020/0398743 A1   12/2020  Huber et al.
2021/0166564 A1*   6/2021  Takaki ................... G08G 1/166
2022/0092982 A1    3/2022  Bader
2022/0314877 A1   10/2022  Yamoto

OTHER PUBLICATIONS

Partial European Search Report received for European Patent Application Serial No. 24153437.9 dated May 28, 2024, 15 pages.
Hussain et al., "P2V and V2P Communication for Pedestrian Warning on the basis of Autonomous Vehicles", IEEE 19th International Conference on Intelligent Transportation Systems (ITSC), Nov. 1-4, 2016, pp. 2034-2039.
Extended European Search Report received for European Patent Application Serial No. 24153437.9 dated Aug. 20, 2024, 14 pages.

* cited by examiner

SAE J3016™ LEVELS OF DRIVING AUTOMATION 2018-06

| | LEVEL 0 | LEVEL 1 | LEVEL 2 | LEVEL 3 | LEVEL 4 | LEVEL 5 |
|---|---|---|---|---|---|---|
| What does the human in driver's seat have to do? | You _are_ driving whenever these driver support features are engaged – even if your feet are off the pedals and you are not steering. You must constantly supervise these support features; you must steer, brake or accelerate as needed to maintain safety | | | You _are not_ driving whenever these automated driving features are engaged – even if you are seated in "the driver's seat". When the feature requests, you must drive | These automated driving features will not require you to take over driving | |
| What do these features do? | These are driver support features | | | These are automated driving features | | |
| | These features are limited to providing warnings and momentary assistance | These features provide steering OR brake/ acceleration support to the driver | These features provide steering AND brake/ acceleration support to the driver | These features can drive the vehicle under limited conditions and will not operate unless all required conditions are met | These features can drive the vehicle under limited conditions | This feature can drive the vehicle under all conditions |
| Example Features | • automatic emergency braking<br>• blind spot warning<br>• lane departure warning | • lane centering OR<br>• adaptive cruise control | • lane centering AND<br>• adaptive cruise control at the same time | • traffic jam chauffeur | • local driverless taxi<br>• pedals/ steering wheel may or may not be installed | • same as level 4, but feature can drive everywhere in all conditions |

FIG. 16 (Prior Art)

PEDESTRIAN CROSSING MANAGEMENT USING AUTONOMOUS VEHICLES

TECHNICAL FIELD

This application relates to techniques facilitating operation of a vehicle to detect and avoid injury to pedestrians.

BACKGROUND

While advances in technology have greatly benefitted society, interaction with the technology often leads to both distracted pedestrians and drivers. A study by the National Highway Traffic Safety Administration (NHTSA) indicates that between 2010 to 2019 a 46% increase in the number of pedestrian fatalities occurred. In a common scenario, a pedestrian may be crossing a street while distracted (e.g., looking at their phone) but a driver sees the pedestrian, applies the vehicles brakes while getting the pedestrian's attention in an attempt to prevent an accident. However, a situation can readily occur where both the pedestrian and the driver are distracted, and accordingly, there is not enough time for the distracted driver to brake upon seeing the pedestrian, that is assuming the driver sees the pedestrian. Distracted drivers and distracted pedestrians are not a new problem, however, the number of distractors is increasing due to technology, with a corresponding increase in the number of fatalities due to distracted walking.

The above-described background is merely intended to provide a contextual overview of some current issues and is not intended to be exhaustive. Other contextual information may become further apparent upon review of the following detailed description.

SUMMARY

The following presents a summary to provide a basic understanding of one or more embodiments described herein. This summary is not intended to identify key or critical elements, or delineate any scope of the different embodiments and/or any scope of the claims. The sole purpose of the summary is to present some concepts in a simplified form as a prelude to the more detailed description presented herein.

In one or more embodiments described herein, systems, devices, computer-implemented methods, methods, apparatus and/or computer program products are presented to facilitate a reduction in road traffic accidents by utilizing one or more systems/technologies located onboard an autonomous vehicle (AV).

According to one or more embodiments, a system is provided to mitigate collisions between vehicles and pedestrians. The system can be located on a first vehicle, wherein the first vehicle is operating at least partially autonomously. The system can comprise a memory that stores computer executable components and a processor that executes the computer executable components stored in the memory. The computer executable components can comprise an accident component that can be configured to determine whether a second vehicle driving along a road will collide with a pedestrian crossing the road. In response to determining that, under current operation, the second vehicle will collide with the pedestrian, the accident component can be further configured to initiate a notification to achieve at least one of attention of the pedestrian or attention of a driver of the second vehicle to prevent the collision from occurring. The computer executable components can further comprise a pedestrian component that can be configured to detect the pedestrian crossing the road and can be further configured to determine at least one of a direction of travel of the pedestrian, a speed of motion of the pedestrian, a direction the pedestrian is viewing, or a focus of attention of the pedestrian.

In another embodiment, the computer executable components can further comprise a vehicle detection component which can be configured to detect the second vehicle driving along the road and determine at least one of a direction of travel of the second vehicle, a velocity of the second vehicle, a vehicle type for the second vehicle, or a focus of attention of the driver of the second vehicle. In a further embodiment, the computer executable components can further comprise a road component which can be configured to detect at least one of a crosswalk or line markings indicating a lane on the road.

In another embodiment, the computer executable components can further comprise a warning component which can be configured to receive the notification, and in response to receiving the notification, can activate operation of at least one on-board device, wherein the at least one on-board device is a car horn or headlights. In a further embodiment, the warning component can be further configured to initiate transmission of a warning notification to at least one remote device, wherein the at least one remote device is a device located on-board the second vehicle or a portable device being conveyed by the pedestrian. The portable device can be one of a mobile device, a cellular phone, a laptop, a tablet pc, a wearable computing device, or an internet of things (IoT) device.

In a further embodiment, the computer executable components can further comprise a camera configured to provide imagery of the pedestrian. In another embodiment, the computer executable components can further comprise an algorithm which can be configured to determine a current focus of attention of the pedestrian, wherein the determination is based upon identifying the face of the pedestrian in the imagery captured from the pedestrian by the camera.

In another embodiment, the camera can be further configured to provide imagery of the second vehicle. In another embodiment, the computer executable components can further comprise an algorithm which can be configured to extract at least one of a license plate of the second vehicle, a manufacturer of the second vehicle, a model type of the second vehicle, a height of a structure on the second vehicle, a width of the second vehicle, or an axle width of the second vehicle. The system can further include an onboard vehicle database comprising license plates associated with manufacturers and models of vehicles. The computer executable components can further comprise a vehicle detection component which can be configured to identify the license plate in the vehicle database, determine the model type of the second vehicle based on a model type assigned to the license plate in the vehicle database, and can further determine at least one dimension of the second vehicle, wherein the at least one dimension is one of the height of the structure on the second vehicle, the width of the second vehicle, or the axle width of the second vehicle.

In other embodiments, elements described in connection with the disclosed systems can be embodied in different forms such as computer-implemented methods, computer program products, or other forms. For example, in an embodiment, a computer-implemented method can be utilized for detecting, by a device comprising a processor located on a vehicle (AV) wherein the AV is operating at least in a partially autonomous manner, a presence of a pedestrian crossing a road being navigated by the AV and a presence of a second vehicle driving along the road towards the pedestrian. The method can further comprise determining a possibility of the second vehicle colliding with the pedestrian, and in response to determining the second vehicle and the pedestrian will be at the same portion of the road at the same time, generating a warning to achieve the attention of at least one of the pedestrian or a driver of the second vehicle. In an embodiment, the warning can entail activating operation of at least one device located onboard the AV, wherein the at least one device is a car horn or flashing headlights. In a further embodiment, the method can further comprise determining a focus of attention of the pedestrian, and in response to determining the focus of attention is on a portable computing device, transmitting a warning to the portable computing device for presentment on the portable computing device.

In another embodiment, the method can further comprise analyzing digital images received at the AV to determine the presence and motion of the pedestrian during a period of time and the presence and motion of the second vehicle during the same period of time. The digital images can be further analyzed to detect a crosswalk located on the road (wherein the pedestrian is crossing the road via the crosswalk), as well as determining the width of the crosswalk and determining whether the pedestrian can reach the end of the crosswalk safely in the event of a reduction in velocity of the second vehicle. The method can further comprise determining a focus of attention of the pedestrian, and in response to determining the focus of attention is on a portable computing device, transmitting a warning to the portable computing device for presentment on the portable computing device.

In another embodiment, a computer program product comprising a computer readable storage medium having program instructions embodied therewith, the program instructions executable by a processor, causing the processor to: monitor motion and direction of a pedestrian crossing a road being navigated by a first vehicle, wherein the processer is located on the first vehicle, and further monitor motion and direction of a second vehicle driving towards the pedestrian, and in response to determining a probability of the second vehicle colliding with the pedestrian, generate a warning to obtain attention of at least one of the pedestrian or a driver of the second vehicle regarding an imminent collision. In an embodiment, the warning can be at least one of an audible alarm or a visual alarm, wherein the warning can be generated by at least one of a device located on the first vehicle, a portable device being carried by the pedestrian, or a device onboard the vehicle.

The program instructions can be further configured to analyze sensor information gathered by at least one sensor located on the first vehicle to determine a trajectory of motion of the pedestrian and a trajectory of motion of the second vehicle, and further, determine whether the trajectory of motion of the pedestrian will intersect with the trajectory of motion of the second vehicle, wherein a determined intersection indicates a location at which the second vehicle collides with the pedestrian.

In an embodiment, first vehicle can be operated in one of an autonomous, a partially autonomous, or a non-autonomous manner and the second vehicle can be operated in one of an autonomous, a partially autonomous, or a non-autonomous manner.

An advantage of the one or more systems, computer-implemented methods and/or computer program products can be utilizing various systems and technologies located on an AV to monitor presence and movement of both a pedestrian and another vehicle to enable a determination of a collision may occur between the two, and in the event of determining that a collision is likely, generating a notification warning the pedestrian and/or the vehicle of their respective presence, thereby reducing the likelihood of the collision occurring.

DESCRIPTION OF THE DRAWINGS

One or more embodiments are described below in the Detailed Description section with reference to the following drawings.

FIG. 16 presents TABLE 1600 presenting a summary of SAE J3016 detailing respective functions and features during Levels 0-5 of driving automation (per June 2018).

DETAILED DESCRIPTION

Figure 1:
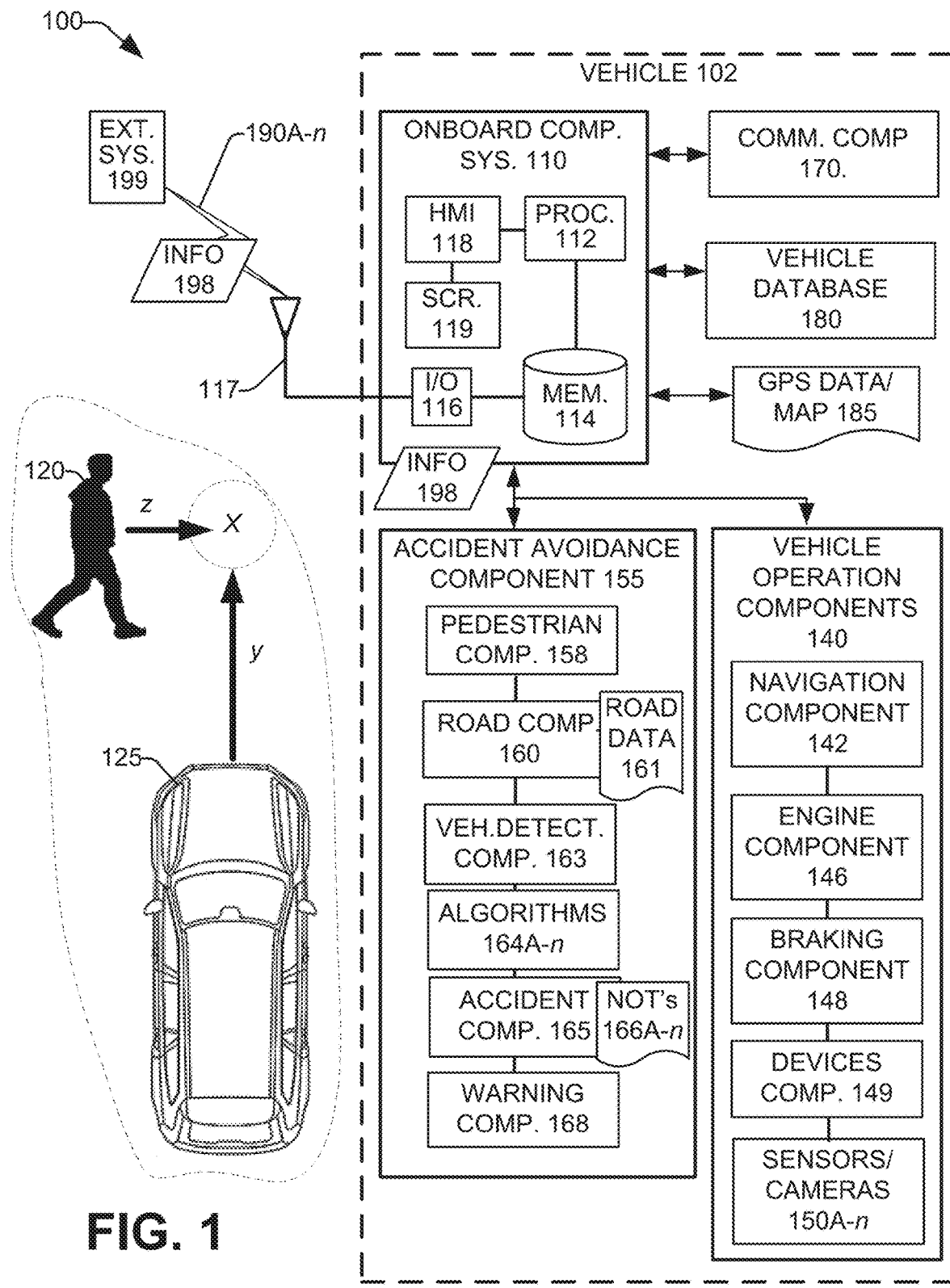
FIG. 1 illustrates a system that can be utilized by an Autonomous Vehicle (AV) to reduce traffic accidents between vehicles and pedestrians, in accordance with one or more embodiments.

The following detailed description is merely illustrative and is not intended to limit embodiments and/or application or uses of embodiments. Furthermore, there is no intention to be bound by any expressed and/or implied information presented in any of the preceding Background section, Summary section, and/or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

It is to be understood that when an element is referred to as being "coupled" to another element, it can describe one or more different types of coupling including, but not limited to, chemical coupling, communicative coupling, electrical coupling, electromagnetic coupling, operative coupling, optical coupling, physical coupling, thermal coupling, and/or another type of coupling. Likewise, it is to be understood that when an element is referred to as being "connected" to another element, it can describe one or more different types of connecting including, but not limited to, electrical connecting, electromagnetic connecting, operative connecting, optical connecting, physical connecting, thermal connecting, and/or another type of connecting.

As used herein, "data" can comprise metadata. Further, ranges A-n are utilized herein to indicate a respective plurality of devices, components, signals etc., where n is any positive integer.

In the various embodiments presented herein, the disclosed subject matter can be directed to utilizing one or more components located on a vehicle being operated in an autonomous manner, wherein the one or more components can be utilized to reduce traffic accidents between pedestrians crossing a road and a vehicle driving along the road. An autonomous vehicle (AV) can utilize various onboard systems and sensors, including one or more computer implemented algorithms (including vision algorithms), to detect a pedestrian(s) crossing the street. In an embodiment, the onboard system can be configured to determine the distance the pedestrian still has to go to cross the street, as well as the distance between the AV and the pedestrian. As well as determining that the pedestrian is about to step into the road, or is already walking across the road (e.g., at a crosswalk, a pedestrian crossing, a random location on the road (e.g., not at a designated crossing point)), the AV can also detect if another vehicle (a second vehicle, a nearby vehicle, an adjacent vehicle) is approaching the portion of the road where the pedestrian is crossing. In an example scenario, the operator (e.g., driver) of the second vehicle may be distracted, impaired by drugs or alcohol, and such like, and is not paying attention to the road, and accordingly, does not see the pedestrian. In another example scenario, the pedestrian may not be paying attention to the road conditions (e.g., the pedestrian is viewing/listening to content on a cellphone) and does not see the second vehicle approaching them.

The AV can utilize the various onboard sensors and systems to determine/predict a trajectory of the pedestrian as they cross the road, wherein the trajectory can be based (a) on the speed the pedestrian is walking/running, (b) the distance the pedestrian still has to cover to reach a safe position (e.g., other side of road, a central median in the road) relative to the second vehicle, and suchlike. In a further embodiment, the AV can be driving on a road having multiple lanes, such that the AV is driving in a first lane, while the second vehicle can be driving in a second lane, wherein the first lane and the second lane may be for traffic driving in the same direction or in different directions (e.g., the AV and the second vehicle are driving towards each other). Accordingly, the AV can be configured to determine a time it will take the pedestrian to traverse the lane the AV is driving in and the lane the second vehicle is driving in. The AV can determine the velocity of the second vehicle and further predict if the second vehicle is driving such that the second vehicle will be approaching the pedestrian when the pedestrian will be traversing the second lane.

The AV can be configured (e.g., using computer vision algorithms and suchlike) to gather information regarding the second vehicle, e.g., a dimension(s) of the second vehicle, a make and model of the second vehicle based on such information as (a) the license plate of the second vehicle, (b) make/model identifiers on the second vehicle, and the like. Based upon the gathered information, the AV can determine whether the second vehicle has sufficient time to brake safely and hence not collide with the pedestrian.

Based on the data derived from the license plate information, make/model analysis, dimension(s) of the second vehicle, etc., the AV can be further configured to determine an average breaking distance of the second vehicle.

The AV can be configured to perform various risk assessments as to (a) whether the operator of the second vehicle has not seen the pedestrian, (b) the pedestrian is not looking in the direction of the second vehicle (e.g., is looking in a direction away from the second vehicle such as looking at smartphone or in other direction). The AV on-board system can further assess a degree of risk of collision with the second vehicle for a current situation for the pedestrian (such as safe state, moderate risk state, and high risk state), whereby the assessment can be continuously updated as the conditions change.

In another embodiment, if the AV on-board system determines that the second vehicle has not detected the pedestrian, the AV on-board system can attempt to detect the pedestrian's face. If the AV on-board system cannot detect the pedestrian's face, it can mean that the pedestrian is looking at their phone or looking away in any other direction but the lane where V2 is coming, in such an event, the AV on-board system can attempt to get the pedestrians attention by honking and/or blinking the lights. The AV can keep honking/blinking lights until the pedestrian's face has been detected and/or the assessment is "safe" again (e.g., the pedestrian has stopped walking, has reached a safe location, the velocity of the second vehicle is in safe state, and suchlike).

The AV on-board system can also take into consideration the day and time of the week (e.g., Monday morning vs Friday night), as in such assessment the braking distance can be increased.

In a further embodiment, the AV on-board system can include a detection warning feature, whereby the AV can send a warning/notification (e.g., via BLUETOOTH®) to the pedestrian's smartphone when AV detects the pedestrian is looking into his/her phone and listening to music, etc.

Regarding the phrase "autonomous" operation, to enable the level of sophistication of operation of a vehicle to be defined across the industry by both suppliers and policy-makers, standards are available to define the level of autonomous operation. For example, the International Standard J3016 *Taxonomy and Definitions for Terms Related to Driving Automation Systems for On-Road Motor Vehicles* has been developed by the Society of Automotive Engineers (SAE) and defines six levels of operation of a driving automation system(s) that performs part or all of the dynamic driving task (DDT) on a sustained basis. The six levels of definitions provided in SAE J3016 range from no driving automation (Level 0) to full driving automation (Level 5), in the context of vehicles and their operation on roadways. Levels 0-5 of SAE J3016 are summarized below and further presented in FIG. 16, Table 1600.

Level 0 (No Driving Automation): At Level 0, the vehicle is manually controlled with the automated control system (ACS) having no system capability, the driver provides the DDT regarding steering, braking, acceleration, negotiating traffic, and suchlike. One or more systems may be in place to help the driver, such as an emergency braking system (EBS), but given the EBS technically doesn't drive the vehicle, it does not qualify as automation. The majority of vehicles in current operation are Level 0 automation.

Level 1 (Driver Assistance/Driver Assisted Operation): This is the lowest level of automation. The vehicle features a single automated system for driver assistance, such as steering or acceleration (cruise control) but not both simultaneously. An example of a Level 1 system is adaptive cruise control (ACC), where the vehicle can be maintained at a safe distance behind a lead vehicle (e.g., operating in front of the vehicle operating with Level 1 automation) with the driver performing all other aspects of driving and has full responsibility for monitoring the road and taking over if the assistance system fails to act appropriately.

Level 2 (Partial Driving Automation/Partially Autonomous Operation): The vehicle can (e.g., via an advanced driver assistance system (ADAS)) steer, accelerate, and brake in certain circumstances, however, automation falls short of self-driving as tactical maneuvers such as responding to traffic signals or changing lanes can mainly be controlled by the driver, as does scanning for hazards, with the driver having the ability to take control of the vehicle at any time.

Level 3 (Conditional Driving Automation/Conditionally Autonomous Operation): The vehicle can control numerous aspects of operation (e.g., steering, acceleration, and suchlike), e.g., via monitoring the operational environment, but operation of the vehicle has human override. For example, the autonomous system can prompt a driver to intervene when a scenario is encountered that the onboard system cannot navigate (e.g., with an acceptable level of operational safety), accordingly, the driver must be available to take over operation of the vehicle at any time.

Level 4 (High Driving Automation/High Driving Operation): advancing on from Level 3 operation, while under Level 3 operation the driver must be available, with Level 4, the vehicle can operate without human input or oversight but only under select conditions defined by factors such as road type, geographic area, environments limiting top speed (e.g., urban environments), wherein such limited operation is also known as "geofencing". Under Level 4 operation, a human (e.g., driver) still has the option to manually override automated operation of the vehicle.

Level 5 (Full Driving Automation/Full Driving Operation): Level 5 vehicles do not require human attention for operation, with operation available on any road and/or any road condition that a human driver can navigate (or even beyond the navigation/driving capabilities of a human). Further, operation under Level 5 is not constrained by the geofencing limitations of operation under Level 4. In an embodiment, Level 5 vehicles may not even have steering wheels or acceleration/brake pedals. In an example of use, a destination is entered for the vehicle (e.g., by a passenger, by a supply manager where the vehicle is a delivery vehicle, and suchlike), wherein the vehicle self-controls navigation and operation of the vehicle to the destination.

To clarify, operations under levels 0-2 can require human interaction at all stages or some stages of a journey by a vehicle to a destination. Operations under levels 3-5 do not require human interaction to navigate the vehicle (except for under level 3 where the driver is required to take control in response to the vehicle not being able to safely navigate a road condition).

As referenced herein, DDT relates to various functions of operating a vehicle. DDT is concerned with the operational function(s) and tactical function(s) of vehicle operation, but may not be concerned with the strategic function. Operational function is concerned with controlling the vehicle motion, e.g., steering (lateral motion), and braking/acceleration (longitudinal motion). Tactical function (aka, object and event detection and response (OEDR)) relates to the navigational choices made during a journey to achieve the destination regarding detecting and responding to events and/or objects as needed, e.g., overtake vehicle ahead, take the next exit, follow the detour, and suchlike. Strategic function is concerned with the vehicle destination and the best way to get there, e.g., destination and way point planning. Regarding operational function, a Level 1 vehicle under SAE J3016 controls steering or braking/acceleration, while a Level 2 vehicle must control both steering and braking/acceleration. Autonomous operation of vehicles at Levels 3, 4, and 5 under SAE J3016 involves the vehicle having full control of the operational function and the tactical function. Level 2 operation may involve full control of the operational function and tactical function but the driver is available to take control of the tactical function.

Accordingly, the term "autonomous" as used herein regarding operation of a vehicle with or without a human available to assist the vehicle in self-operation during navigation to a destination, can relate to any of Levels 1-5. In an embodiment, for example, the terms "autonomous operation" or "autonomously" can relate to a vehicle operating at least with Level 2 operation, e.g., a minimum level of operation is Level 2: partially autonomous operation, per SAE J3016. Hence, while Level 2, partially autonomous operation, may be a minimum level of operation, higher levels of operation, e.g., Levels 3-5, are encompassed in operation of the vehicle at Level 2 operation. Similarly, a minimum Level 3 operation encompasses Levels 4-5 operation, and minimum Level 4 operation encompasses operation under Level 5 under SAE J3016.

It is to be appreciated that while the various embodiments presented herein are directed towards to one or more vehicles (e.g., vehicle 102) operating in an autonomous manner (e.g., as an AV), the various embodiments presented herein are not so limited and can be implemented with a group of vehicles operating in any of an autonomous manner (e.g., Level 5 of SAE J3016), a partially autonomous manner (e.g., Level 1 of SAE J3016 or higher), or in a non-autonomous manner (e.g., Level 0 of SAE J3016). For example, a first vehicle can be operating in an autonomous manner (e.g., any of Levels 3-5), a partially autonomous manner (e.g., any of levels 1-2), or in a non-autonomous manner (e.g., Level 0), while a second vehicle (e.g., vehicle 125), a lead vehicle behind which the first vehicle is driving, can also be operating in any of an autonomous manner, a partially autonomous manner, or in a non-autonomous manner.

Further, while the various embodiments presented herein are presented regarding detecting a pedestrian crossing a street via a crosswalk, the embodiments are not so limited and are applicable to any situation involving a potential interaction between a pedestrian and a vehicle. For example, the pedestrian can be crossing the street at a random location, and hence is crossing at a portion of the road that is not designated as a crosswalk.

Turning now to the drawings, FIG. 1 illustrates a system 100 that can be utilized by an AV to reduce traffic accidents between vehicles and pedestrians, in accordance with one or more embodiments. System 100 comprises a vehicle 102 with various devices and components located thereon, such as an onboard computer system (OCS) 110, wherein the OCS 110 can be a vehicle control unit (VCU). The OCS 110 can be utilized to provide overall operational control and/or operation of the EV. In an embodiment, the OCS 110 can be configured to operate/control/monitor various vehicle operations, wherein the various operations can be controlled by one or more vehicle operation components 140 communicatively coupled to the OCS 110. The various vehicle operation components 140 can include a navigation component 142 configured to navigate vehicle 102 along a road as well as to control steering of the vehicle 102. The vehicle operation components 140 can further comprise an engine component 146 configured to control operation, e.g., start/stop, of an engine configured to propel the vehicle 102. The vehicle operation components 140 can further comprise a braking component 148 configured to slow down or stop the vehicle 102. The vehicle operation components 140 can further include a devices component 149 configured to control operation of any onboard devices suitable to get the attention of a pedestrian (e.g., a pedestrian 120), driver of another vehicle (e.g., vehicle 125), and the like. The onboard devices can include a device configured to generate an audible signal (e.g., a car horn on the vehicle 102) and/or a visual signal (e.g., headlights on the vehicle 102).

The vehicle operation components 140 can further comprise various sensors and/or cameras 150A-n configured to monitor operation of vehicle 102 and further obtain imagery and other information regarding an environment/surroundings the vehicle 102 is operating in. The sensors/cameras 150A-n can include any suitable detection/measuring device, including cameras, optical sensors, laser sensors, Light Detection and Ranging (LiDAR) sensors, sonar sensors, audiovisual sensors, perception sensors, road lane sensors, motion detectors, velocity sensors, and the like, as employed in such applications as simultaneous localization and mapping (SLAM), and other computer-based technologies and methods utilized to determine an environment being navigated by vehicle 102 and the location of the vehicle 102 within the environment (e.g., location mapping). Digital images, data, and the like generated by sensors/cameras 150A-n can be analyzed by algorithms 164A-n to identify respective features of interest such as a pedestrian 120, another vehicle 125, lane markings, crosswalk markings, etc.

As shown, vehicle 102 can further include an accident avoidance component (AAC) 155, wherein the AAC 155 can further comprise various components that can be utilized to mitigate traffic accidents between vehicles and pedestrians. As shown in FIG. 1, the AAC 155 can be communicatively coupled to the OCS 110, the vehicle operation components 140, and other components located on board vehicle 102.

A pedestrian component 158 can be included in the AAC 155, wherein the pedestrian component 158 can be configured to monitor and identify (aka determine/predict/project) motion of a pedestrian 120, a trajectory of the pedestrian 120, (e.g., direction z as shown on FIG. 1), whether the pedestrian is distracted (e.g., using a portable device such as a cellphone), whether the pedestrian is engaged with their surroundings such as looking in the direction of the vehicle 125, and such like. The pedestrian component 158 can be configured to receive information/data from the various on-board sensors and cameras 150A-n, as well as provided by algorithms 164A-n (e.g., a computer vision algorithm, digital imagery algorithm, and suchlike), and the like.

A road component 160 can be included in the AAC 155, wherein the road component 160 can analyze information (e.g., digital images, data) from various on-board sensors and cameras 150A-n to identify respective lane markings and suchlike, from which the road component 160 can generate road data 161 regarding a road being navigated by the vehicle 102. Accordingly, the road data 161 can include information regarding the width of the road, number of lanes forming the road, width of the lane(s), crosswalk location, and the like. The road component 160 can further receive information from a GPS data/map system 185, wherein the GPS data/map system 185 can provide information to supplement the road data 161 (e.g., location of a crosswalk, number of lanes forming the road, width of the road, width of a lane(s), and the like). Further, the road component 160 can receive road information from an external system 199 (e.g., a remote GPS system) that can further provide information regarding the road being navigated which can further supplement road data 161.

The AAC 155 can further include a vehicle detection component 163 which can be configured to identify and monitor operation (e.g., motion, direction) of another vehicle, e.g., vehicle 125 driving in direction y (per FIG. 1), that is also navigating the road being navigated by the vehicle 102. The vehicle detection component 163 can be configured to receive information regarding the vehicle 125 from data generated by the sensors/cameras 150A-n, wherein the information can be make/model of vehicle 125, license plate of vehicle 125, one or more dimensions of vehicle 125, and suchlike. Further, the vehicle detection component 163 can access a vehicle database 180 (e.g., located onboard vehicle 102) which can provide make/model information regarding vehicle 125, as further discussed herein. In another embodiment, the vehicle detection component 163 can be configured to determine whether the driver of vehicle 125 is engaged with their surroundings such as looking in the direction of the pedestrian 120, and such like.

The AAC 155 can further comprise various algorithms 164A-n respectively configured to determine information, make predictions, etc., regarding any of the road being navigated, a velocity of a person (e.g., pedestrian 120) crossing/or about to cross a road, a velocity of the vehicle 102, a velocity of another vehicle (e.g., vehicle 125), a time it will potentially take a pedestrian to cross a road (e.g., road 205), a time and position of another vehicle 125, a trajectory of the pedestrian 120, a trajectory of the other vehicle 125, a potential intersection (marked x on FIG. 1) of the trajectory of the pedestrian 120 and the other vehicle 125, and suchlike. Algorithms 164A-n can include a computer vision algorithm(s), a digital imagery algorithm(s), position prediction, velocity prediction, direction prediction, and suchlike, to enable the respective determinations, predictions, etc., per the various embodiments presented herein.

An accident component 165 can be further included in the AAC 155, wherein the accident component 165 can be configured to determine whether the vehicle 125 is going to collide with the pedestrian 120, a likelihood of collision, a location of collision (e.g., at location x on FIG. 1), and suchlike. As shown in FIG. 1, the accident component 165 can be configured to analyze the wealth of information generated regarding pedestrian 120 (e.g., their speed and motion, trajectory z, distractedness, and suchlike.) and the vehicle 125 (e.g., speed and motion, trajectory y, distractedness of the driver, and suchlike). The accident component 165 can be configured to generate one or more notifications 166A-n regarding a respective likelihood of an accident occurring between the pedestrian 120 and the vehicle 125.

The AAC 155 can further include a warning component 168. The warning component 168 can be configured to operate in conjunction with the accident component 165, wherein the warning component 168 can receive a notification 166A from the accident component 165 that there is a high likelihood of collision between the pedestrian 120 and the vehicle 125. In response to receiving the notification 166A, the warning component 168 can interact with the devices component 149 to initiate operation of the headlights, car horn, etc., to obtain the attention of the pedestrian 120 and/or driver of vehicle 125. In a further embodiment, as described herein, the warning component 168 can also generate a warning(s) via communications technology configured to interact between the vehicle 102 and a device (e.g., a cellphone) being carried by the pedestrian 120 and/or onboard the vehicle 125. The communications technology interaction can be undertaken via the communication component 170. The communication component 170 can be configured to establish and conduct communications with other vehicles on the road, external entities and systems, etc., e.g., via I/O 116.

Vehicle 102 can also include a vehicle database 180, wherein the vehicle database 180 can comprise various vehicle identifiers such as makes/models, a list of license plates and vehicles they are registered to, and suchlike, to enable determination of a vehicle operating in the locality of vehicle 102 (e.g., by the vehicle detection component 163). The vehicle database 180 can further include information regarding a model/make of a vehicle, such as the axle width of the vehicle, such that the axle width of a lead vehicle can be determined from the license plate and/or the make/model of the lead vehicle as determined by analysis of imagery of the lead vehicle captured by the one or more cameras 150A-n and a computer vision algorithm(s) in algorithms 164A-n.

As shown in FIG. 1, the OCS 110 can further include a processor 112 and a memory 114, wherein the processor 112 can execute the various computer-executable components, functions, operations, etc., presented herein. The memory 114 can be utilized to store the various computer-executable components, functions, code, etc., as well as road data 161, algorithms 164A-n, notifications 166A-n, information (e.g., motion, trajectory) regarding pedestrian 120, information (e.g., motion, trajectory) regarding vehicle 125, and suchlike (as further described herein). In an embodiment, the vehicle operation components 140 can form a standalone component communicatively coupled to the OCS 110, and while not shown, the vehicle operation components 140 can operate in conjunction with a processor (e.g., functionally comparable to processor 112) and a memory (e.g., functionally comparable to memory 114) to enable navigation, steering, braking/acceleration, etc., of vehicle 102 to a destination. In another embodiment, the vehicle operation components 140 can operate in conjunction with the processor 112 and memory 114 of the OCS 110, wherein the various control functions (e.g., navigation, steering, braking/acceleration) can be controlled by the OCS 110. Similarly, the AAC 155 can form a standalone component communicatively coupled to the OCS 110, and while not shown, the AAC 155 can operate in conjunction with a processor (e.g., functionally comparable to processor 112) and a memory (e.g., functionally comparable to memory 114) to enable accident detection, e.g., during operation of vehicle 102. In another embodiment, the AAC 155 can operate in conjunction with the processor 112 and memory 114 of the OCS 110, wherein the various accident detection functions can be controlled by the OCS 110. In a further embodiment, the OCS 110, vehicle operation components 140, and the AAC 155 (and respective sub-components) can operate using a common processor (e.g., processor 112) and memory (e.g., memory 114).

As further shown, the OCS 110 can include an input/output (I/O) component 116, wherein the I/O component 116 can be a transceiver configured to enable transmission/receipt of information 198 (e.g., a warning notification, road data 161, and the like) between the OCS 110 and any external system(s) (e.g., external system 199), e.g., an onboard system of vehicle 125, a cellphone, a GPS data system, and suchlike. I/O component 116 can be communicatively coupled, via an antenna 117, to the remotely located devices and systems (e.g., external system 199). Transmission of data and information between the vehicle 102 (e.g., via antenna 117 and I/O component 116) and the remotely located devices and systems can be via the signals 190A-n. Any suitable technology can be utilized to enable the various embodiments presented herein, regarding transmission and receiving of signals 190A-n. Suitable technologies include BLUETOOTH®, cellular technology (e.g., 3G, 4G, 5G), internet technology, ethernet technology, ultra-wideband (UWB), DECAWAVER, IEEE 802.15.4a standard-based technology, Wi-Fi technology, Radio Frequency Identification (RFID), Near Field Communication (NFC) radio technology, and the like.

In an embodiment, the OCS 110 can further include a human-machine interface (HMI) 118 (e.g., a display, a graphical-user interface (GUI)) which can be configured to present various information including imagery of/information regarding pedestrian 120, vehicle 125, the road, alarms, warnings, information received from external systems and devices, etc., per the various embodiments presented herein. The HMI 118 can include an interactive display 119 to present the various information via various screens presented thereon, and further configured to facilitate input of information/settings/etc., regarding operation of the vehicle 102. In an embodiment, in the event that vehicle 102 is being operated in a non-autonomous manner (e.g., Level 0 of SAE J3016), operation of the warning component 168 and notifications 166A-n can be utilized to present a warning on the HMI 118 and screen 119 to notify the driver of vehicle 102 of the possible collision.

Figure 2A:
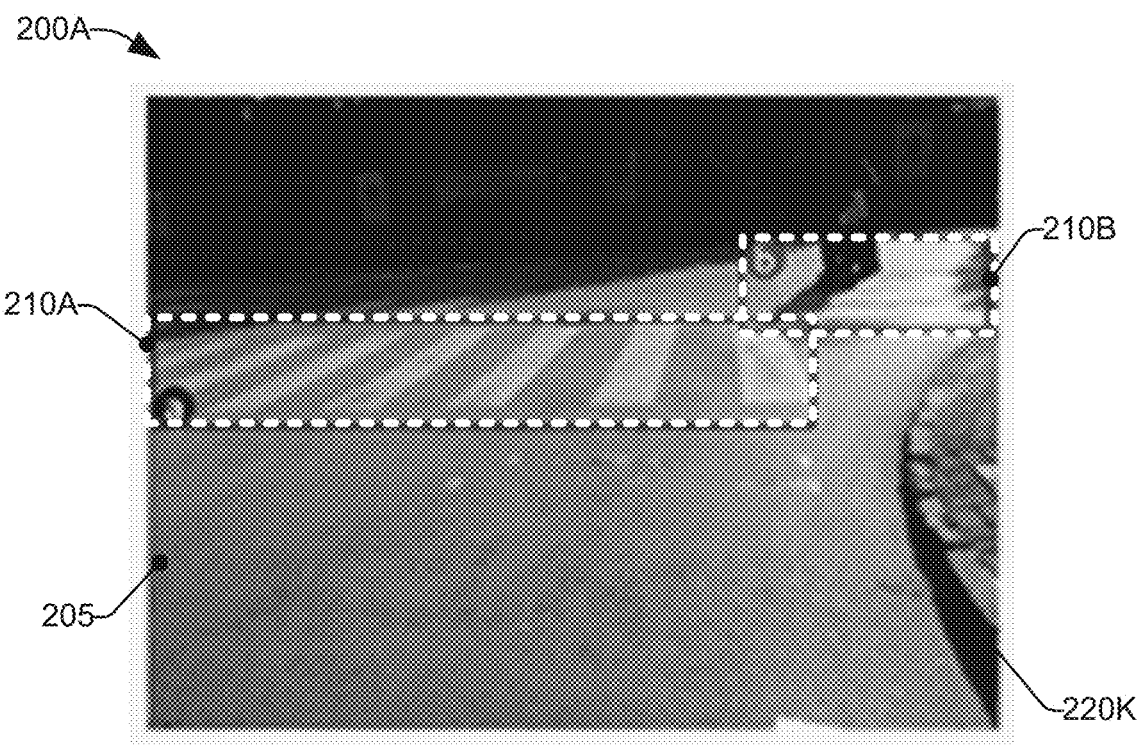
FIGS. 2A and 2B present images illustrating analysis of roads and determination of presence of one or more crosswalks, according to at least one embodiment.
Figure 2B:
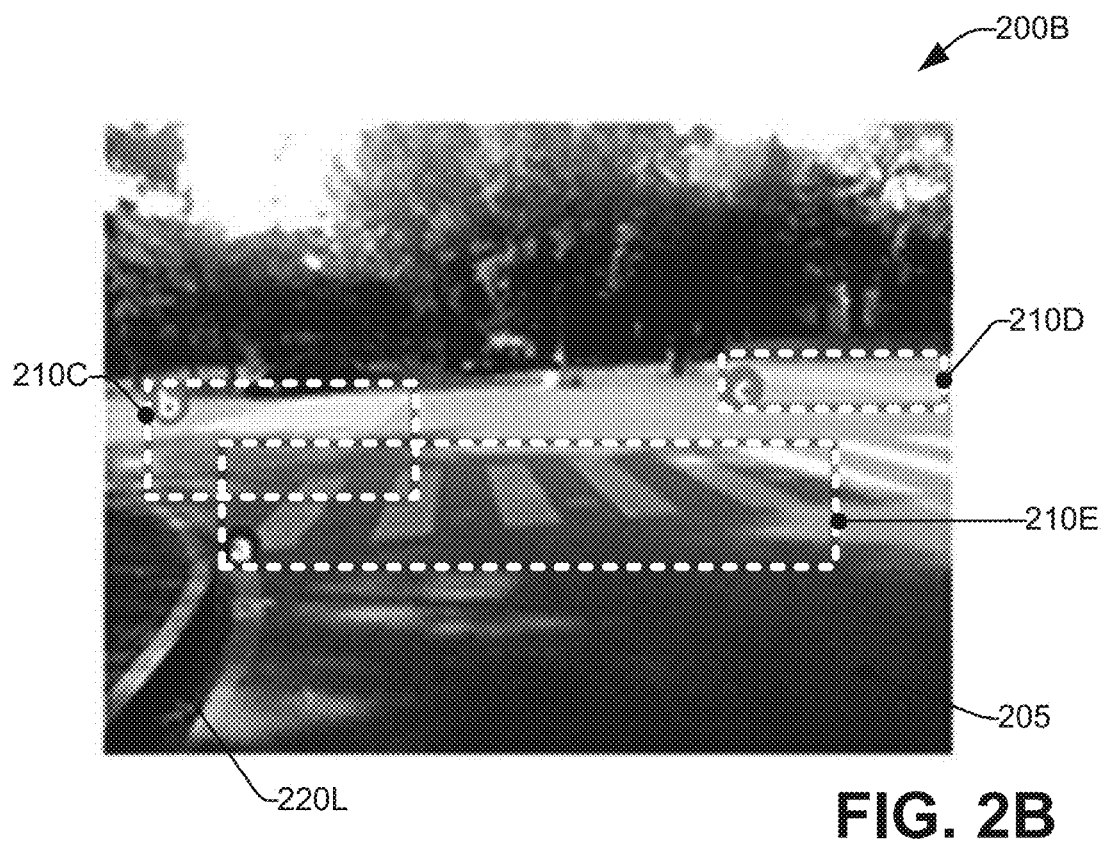

As mentioned, as well as monitoring respective motion and/or direction of pedestrian 120 and/or vehicle 125, the various sensors/cameras 150A-n and algorithms 164A-n can be utilized to generate images and information regarding the operational environment of vehicle 102. A field of view of a camera 150A and/or field of detection of sensor 150B can also include any road markings on the road being navigated by vehicle 102. In an embodiment, the road markings can indicate the presence of a crosswalk. FIGS. 2A and 2B, images 200A and 200B illustrate respective situations comprising a first situation (image 200A) with a road 205 having two crosswalks 210A and 210B identified (e.g., by a computer vision algorithm 164A), and a second situation (image 200B) with a road 205 having three crosswalks 210C, 210D, and 210E identified (e.g., by a computer vision algorithm 164A). In another embodiment, road markings 220A-n can indicate roadside kerb/curb structures (e.g., kerbs 220K and 220L), and lane markings such as white and/or yellow painted stripes indicating a road edge, road/pavement interface, slow lane, fast lane, bus lane, bike lane, pedestrian lane, etc., where the stripes can be a continuous line or a broken pattern. Lane markings can also be indicated by other techniques, such as white stones, rumble strips, reflective beads or surfaces located on or in a road surface, such as reflective studs colloquially termed "cat's eyes", and such like. As mentioned previously, the road component 160 can be configured to compile road data 161 regarding the presence of crosswalks 210A-n, lane markings 220A-n, and suchlike.

Figure 3:
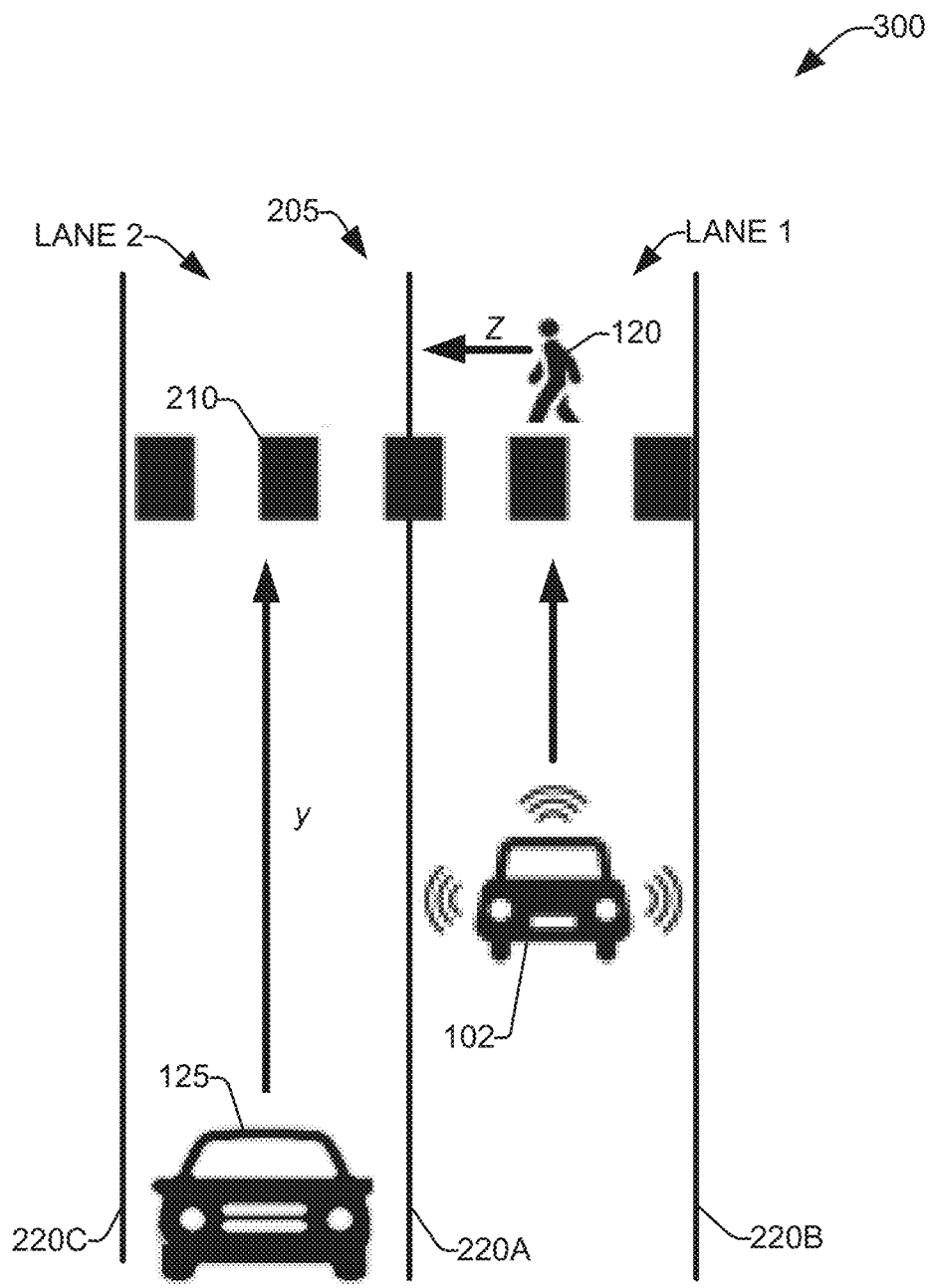
FIG. 3 is a schematic of a pedestrian crossing a road with a vehicle advancing towards the pedestrian, according to one or more embodiments.

FIG. 3, schematic 300, illustrates a scenario of application for the various embodiments presented herein. FIG. 3 illustrates a road 205 comprising two lanes, LANE 1 and LANE 2 which are respectively marked with lane markings 220A, 220B, and 220C. A crosswalk 210 runs across both lanes. A pedestrian 120 is walking in the crosswalk 210 in direction z. Further, a vehicle 102 is driving in LANE 1 towards the pedestrian 120/crosswalk 210, wherein, as previously mentioned, vehicle 102 can be operating autonomously as an AV. A second vehicle 125 is driving in LANE 2, also towards the pedestrian 120/crosswalk 210 (direction y), wherein the vehicle 125 may be being driven by a driver (who may be distracted, looking in a direction not in the direction of the pedestrian 120). The vehicle 125 may also be being driven in an autonomous manner but the ability of vehicle 125 to see the pedestrian 120 may be occluded by vehicle 102 (e.g., vehicle 102 is in the line of sight of sensors/cameras located on vehicle 125). In an embodiment, the vehicle 102 can communicate with vehicle 125 such information gathered by vehicle 102 (e.g., via sensors/cameras 150A-n and algorithms 164A-n) can be shared with the vehicle 125, thereby preventing vehicle 125 from colliding with pedestrian 120. In another embodiment, information can be shared by vehicle 102 to vehicle 125 to supplement information at the vehicle 125 to assist a driver of vehicle 125. As shown in FIG. 3, a possibility exists that if either of pedestrian 120 or vehicle 125 are respectively unaware of each other's presence, an accident can occur. As mentioned previously, the road component 160 can be configured to compile road data 161 regarding the presence of crosswalks 210A-n, lane markings 220A-n, and suchlike. Further, the pedestrian component 158 can monitor the pedestrian 120, the vehicle detection component 163 can monitor the vehicle 125, and the accident component 165 can assess, and react to, a likelihood (risk) of an accident occurring between the pedestrian 120 and the vehicle 125.

Figure 4:
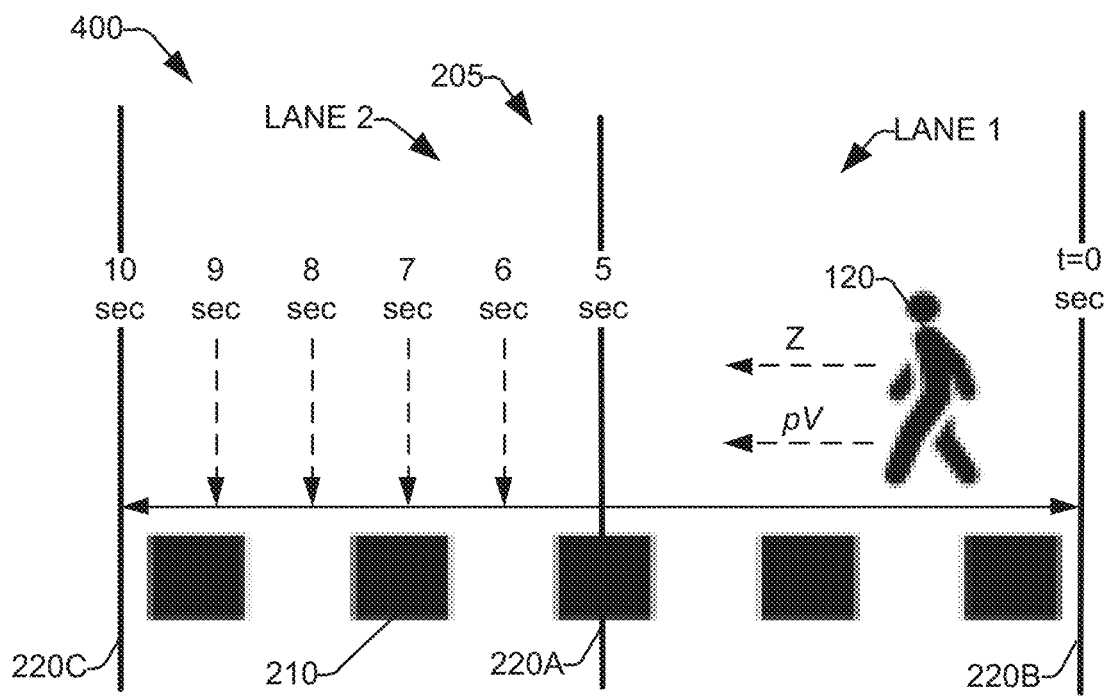
FIG. 4 is a schematic illustrating a pedestrian walking in a crosswalk with the additional element of time and the respective position of the pedestrian, in accordance with one or more embodiments.

Turning to FIG. 4, schematic 400 illustrates a pedestrian walking in a crosswalk with the additional element of time and the respective position of the pedestrian, in accordance with one or more embodiments. Pedestrian 120 is walking across the crosswalk 210, where crosswalk 210 traverses two lanes, LANE 1 and LANE 2, of a road 205 (separated by respective lane markings 220A, 220B, and 220C). With pedestrian 120 stepping into the crosswalk 210 at time t=0 seconds (initial time/moment, initial position), with a trajectory of z, and a velocity of pV, after 5 seconds with pV at a constant rate, pedestrian 120 is projected (future position) to be crossing lane marker 220A from LANE 1 into LANE 2, and then projected to progressively advance across the crosswalk 210 until, after 10 seconds have elapsed, pedestrian 120 will have reached the other side of LANE 2 and steps out of the crosswalk 210. Accordingly, pedestrian 120, with the constant velocity pV, is projected to be in LANE 2 for 5 seconds, from when 5 seconds to 10 seconds have elapsed, and during this period, pedestrian 120 is susceptible to being hit by a vehicle 125 driving in LANE 2. As mentioned previously, the road component 160 can be configured to compile road data 161 regarding the presence of crosswalks 210A-n, lane markings 220A-n, width of the road 205, and suchlike. Further, the pedestrian component 158 can monitor the motion and direction of pedestrian 120 based on images/data received from sensors/cameras 150A-n and algorithms 164A-n. The pedestrian component 158 can further utilize road width data 161 (received from road component 160) to determine/predict/project what the progress/position of the pedestrian 120 will be after various times have elapsed given pV.

Figure 5:
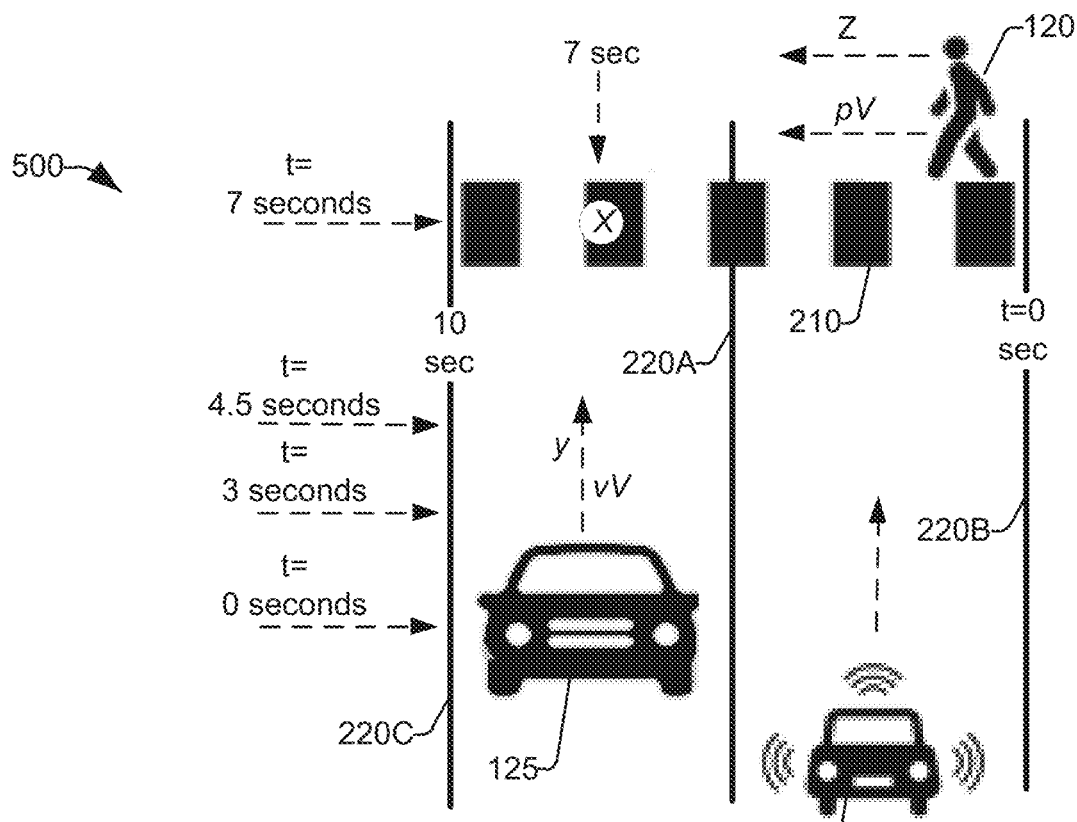
FIG. 5 is a schematic illustrating a pedestrian walking in a crosswalk with a vehicle advancing towards the crosswalk, in accordance with one or more embodiments.

Turning to FIG. 5, schematic 500 illustrates a pedestrian walking in a crosswalk with a vehicle advancing towards the crosswalk, in accordance with one or more embodiments. FIG. 5 advances concepts presented in FIG. 4, with vehicle 102 monitoring operation of vehicle 125 as vehicle 102 and vehicle 125 respectively drive along LANE 1 and LANE 2 of the road 205 (separated by respective lane markings 220A, 220B, and 220C). As shown, the vehicle detection component 163 can detect (e.g., at an initial position based on t=0 seconds) and monitor operation of the vehicle 125 such that vehicle 102 determines that vehicle 125 is driving at a velocity of vV, and based thereon, if velocity vV remains unchanged, vehicle 125 will be in the crosswalk in another 7 seconds. The accident component 165 can be configured to receive the information from the vehicle detection component 163 regarding vehicle 125 and information from the pedestrian component 158 regarding pedestrian 120. Based thereon, the accident component 165 can determine that given the vehicle 125 is projected to be in the crosswalk 210 in another 7 seconds, this projected time/position coincides with the projected time of when pedestrian 120 will also be in a portion of the crosswalk 210 in LANE 2 between lines 220A and 220C (per position x on FIG. 1). Based upon the determination that there is a strong likelihood (a high risk) that the pedestrian 120 and vehicle 125 will collide, the accident component 165 can operate in conjunction with warning component 168, such that accident component 165 can generate a notification 166A regarding the impending accident and transmit the notification 166A to the warning component 168. In response to receipt of the notification 166A, the warning component 168 can initiate attempting to get attention of the pedestrian 120 and or driver of vehicle 125, whereby the warning component 168 can initiate flashing of headlights and/or operation of car horn (via the devices component 149), attempt communication to a portable device being carried by the pedestrian 120 (e.g., via communication component 170 and/or I/O component 116), attempt communication to a device located onboard the vehicle 125, and suchlike.

Figure 6:
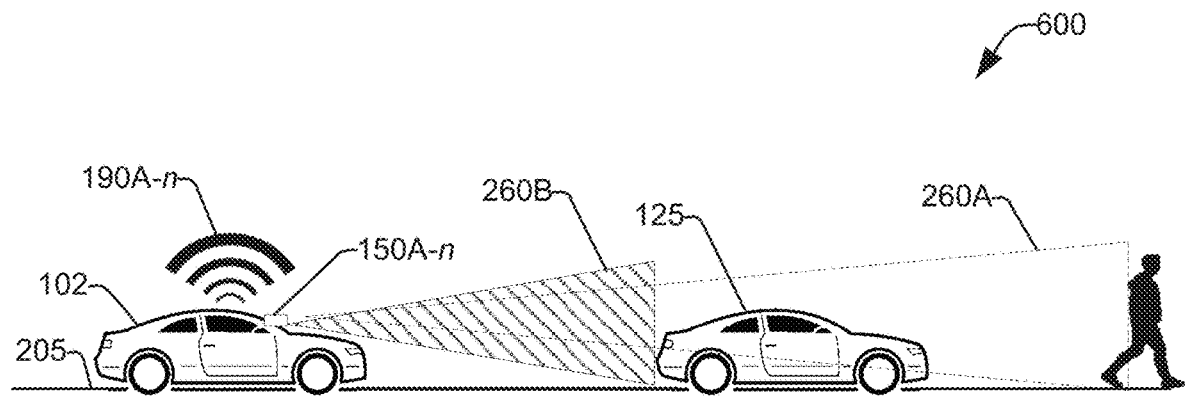
FIG. 6 is a schematic illustrating a vehicle recognition process being performed, in accordance with an embodiment.

Turning to FIG. 6, schematic 600 illustrates a vehicle recognition process being performed, in accordance with an embodiment. As shown, the vehicle 102 is driving on road 205 proximate to both pedestrian 120 and vehicle 125. Vehicle 102 is driving such that at least a first onboard sensor/camera 150A has detected the presence of the pedestrian 120, with the pedestrian 120 in the field of view 660A of the sensor/camera 150A. Further, vehicle 102 is driving such that at least a second onboard sensor/camera 150B has detected the presence of the vehicle 125, with the vehicle 125 in the field of view 660B of the sensor/camera 150B. As previously mentioned, imagery and sensing data received from the respective device in the sensors/cameras 150A-n can be analyzed by one or more components located on vehicle 102 in conjunction with algorithms 164A-n (e.g., computer vision algorithms) to detect/identify/predict motion of the pedestrian 120 and/or the vehicle 125. It is to be noted that the identifiers 660A-n are used herein interchangeably to denote both a field of view of a respective sensor 150A-n as well as to indicate data/imagery that is obtained by the respective sensors 150A-n from objects and features in the landscape being navigated by vehicle 102.

Figure 7:
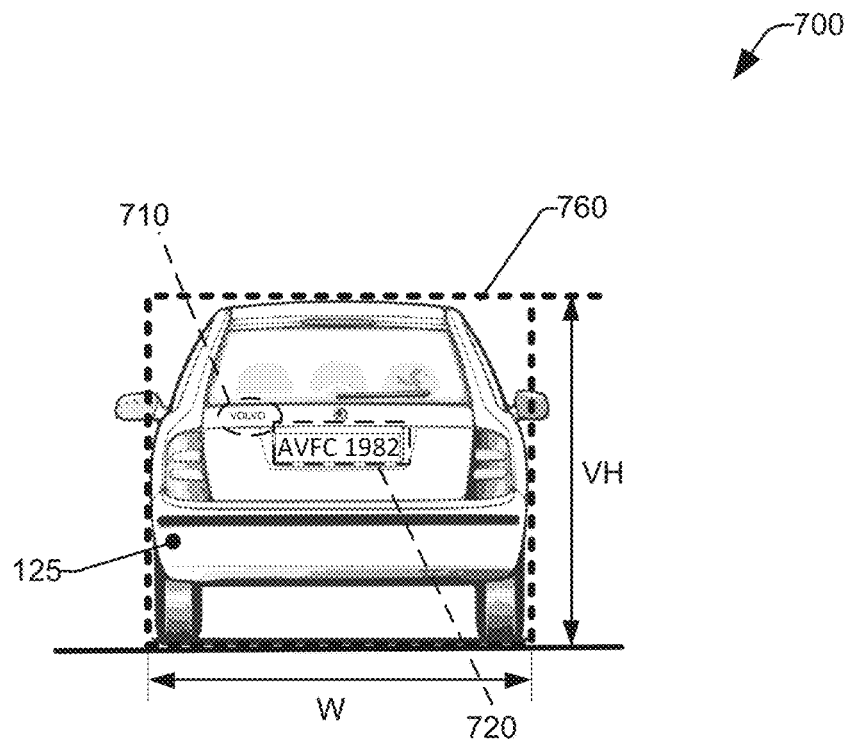
FIG. 7 is a schematic illustrating determination of make/model and various dimensions of a vehicle, in accordance with various embodiments.

Turning to FIG. 7, image 700 illustrates determination of make/model and various dimensions of a vehicle, in accordance with various embodiments. In an embodiment, as shown in FIG. 7, a camera 150A on vehicle 102 can capture imagery that includes a make/model identifier 710 of vehicle 125. A computer vision algorithm 164A on vehicle 102 can identify and extract the make/model identifier 710 from sensing data obtained from the field of view 260B. As further shown in FIG. 7, a camera 150A on vehicle 102 can capture imagery that includes the license plate of vehicle 125, a computer vision algorithm 164A can identify and extract the license plate number 720 from sensing data obtained from the field of view 260B of respective sensors 150A-n. The vehicle detection component 163 can then access/review vehicle database 180 with the make/model 710 and/or license plate number 720 identified, from which the make/model 710 of the of vehicle 125 can be extracted. By identifying the make/model of vehicle 125 it is possible to determine what the breaking distance is for vehicle 125 at various speeds.

As further shown in FIG. 7, the captured imagery can be further analyzed by a computer vision algorithm 164A to enable various dimensions 760 of the vehicle 125 to be determined and, accordingly, the size of the vehicle, from which can be further determined a stopping distance of the vehicle 125 for its current velocity (e.g., by vehicle detection component 163). Dimensions can include vehicle width (W), vehicle height (VH), and suchlike.

Figure 8:
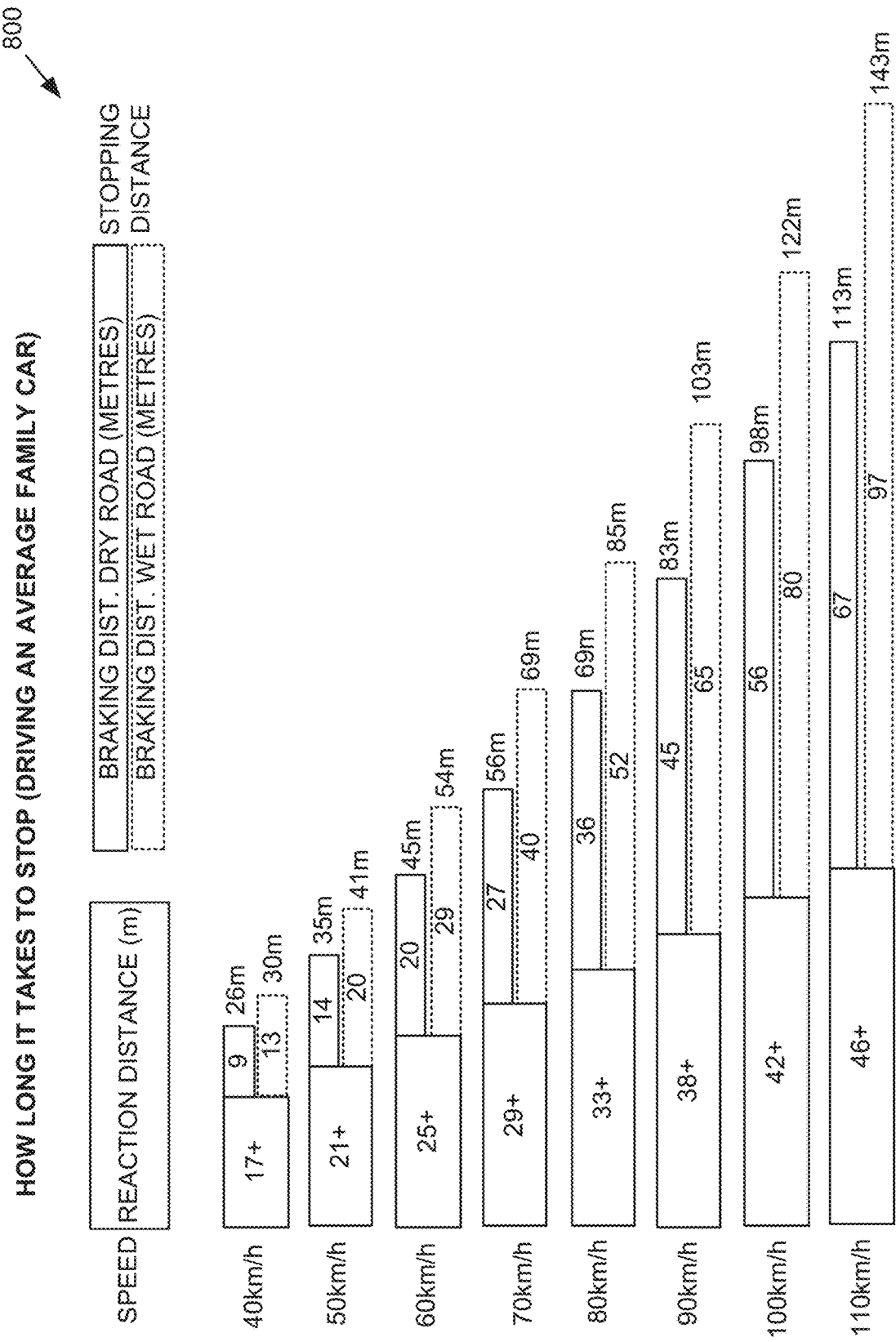
FIG. 8 is a chart presenting reaction times and braking distance at various speeds for an average family car, in accordance with one or more embodiments.

FIG. 8, chart 800 presents reaction times and braking distances for various speeds for an average family car, in accordance with one or more embodiments. Extending the concepts presented in FIG. 7, as mentioned, by knowing the type and/or make/model of vehicle 125, the overall stopping distance required for vehicle 125 for a given velocity can be determined. As shown in chart 800, the faster the vehicle 125 is travelling, the greater the stopping distance, with wet road conditions requiring a longer distance than under dry road conditions. The stopping distance information identified for vehicle 125 can be utilized by the accident component 165 as part of a determination regarding whether the vehicle 125 will collide with pedestrian 120, e.g., as part of the accident determination presented in FIG. 5.

TABLE 1

RISK OF COLLISION BETWEEN A VEHICLE AND A PEDESTRIAN FOR RESPECTIVE TIMES AND DISTANCES WHEN THE VEHICLE IS TRAVELLING CONTINUOUSLY AT 50 kmph/30 mph. (AV = vehicle 102 and V2 = vehicle 125).

| | Time since pedestrian has been detected | Distance from V2 to pedestrian crossing | V2 real time speed (km/h) | Time needed so V2 reaches pedestrian crossing | Minimum distance needed for V2 to brake and not hit the pedestrian | AV's Assessment |
| --- | --- | --- | --- | --- | --- | --- |
| A | 0 secs | 100 meters | 50 | 7 seconds | 35 meters | SAFE: Enough time to brake and pedestrian is not in V2's lane |
| B | 1 secs | 86 meters | 50 | 6 seconds | 35 meters | SAFE: same as above |
| C | 2 secs | 72 meters | 50 | 5 seconds | 35 meters | SAFE: same as above |
| D | 3 secs | 58 meters | 50 | 4 seconds | 35 meters | SAFE: same as above |
| E | 4 secs | 44 meters | 50 | 3 seconds | 35 meters | MODERATE RISK DETECTED: Chances that V2 has not seen the pedestrian. Pedestrian about to enter V2's lane but still enough time to brake |
| F | 5 secs | 30 meters | 50 | 2 seconds | 35 meters | HIGH RISK DETECTED: Even if V2 brakes, the pedestrian will be hit |

TABLE 1-continued

RISK OF COLLISION BETWEEN A VEHICLE AND A PEDESTRIAN FOR RESPECTIVE TIMES AND DISTANCES WHEN THE VEHICLE IS TRAVELLING CONTINUOUSLY AT 50 kmph/30 mph. (AV = vehicle 102 and V2 = vehicle 125).

| | Time since pedestrian has been detected | Distance from V2 to pedestrian crossing | V2 real time speed (km/h) | Time needed so V2 reaches pedestrian crossing | Minimum distance needed for V2 to brake and not hit the pedestrian | AV's Assessment |
|---|---|---|---|---|---|---|
| G | 6 secs | 16 meters | 50 | 1 second | 35 meters | HIGH RISK DETECTED: Even if V2 brakes, the pedestrian will be hit |
| H | 7 secs | 0 m | 50 | reached | 35 meters | HIGH RISK DETECTED: V2 reaches the pedestrian crossing but the pedestrian hasn't crossed yet |

TABLE 1 presents various stages in an analysis process that can be undertaken (e.g., by accident component 165) while determining whether a collision will occur between a pedestrian 120 and a vehicle 125, along with various risk assessments of the collision occurring. TABLE 1 can be read in conjunction with other figures presented herein, particularly FIGS. 4 and 5. A sequence of eight moments in time (A) to (H) are presented in TABLE 1, corresponding to the first 7 seconds of pedestrian 120's traverse of the crosswalk 210 depicted in FIG. 4, and the 7 seconds of vehicle 125's motion towards to crosswalk 210.

During an initial moment (A) in the scenario, at 0 seconds the pedestrian 120 has been detected by vehicle 102, vehicle 125 has been detected by vehicle 102 in LANE 1 at 100 metres (328 feet) from the crosswalk 210 while travelling with a velocity of 50 km/h (30 mph). In an embodiment, assessing the risk of collision (e.g., by the accident component 165) can be initiated upon initial detection of the pedestrian 120. At a velocity of 50 km/h, vehicle 125 will be at the crosswalk 210 in 7 seconds and requires a minimum stopping distance of 35 meters (114 feet). Accordingly, a risk assessment can be conducted (e.g., by accident component 165), whereby, given the pedestrian 120 is still in LANE 1 and there is plenty of time/distance for vehicle 125 to brake, a risk assessment of 'SAFE' is assigned. This risk assessment is maintained through moments (A) to (D).

At moment (E), 4 seconds, the risk assessment is increased to 'MODERATE', as pedestrian 120 is about to venture into LANE 2 and the possibility exists that the pedestrian 120 has not seen vehicle 125, and vehicle 125 has not seen pedestrian 120. However, there is still enough time and distance (44 m/140 ft distance to crosswalk vs 35 m/114 ft braking distance) for vehicle 125 to safely avoid hitting pedestrian 120.

At moment (F), 5 seconds, the risk assessment is increased to 'HIGH RISK', as pedestrian 120 is now moving into LANE 2 and the braking distance is less than the distance to the crosswalk 210 (30 m/140 ft distance to crosswalk vs 35 m/114 ft braking distance), hence it is not possible for vehicle 125 to brake safely prior to being in the crosswalk, hence there exists a high likelihood that the vehicle 125 will hit pedestrian 120. With vehicle 125 remaining at a velocity of 50 km/h, and neither pedestrian 120 or vehicle 125 noticing each other, then moments (G) and (H) will also remain at an assessment of 'HIGH RISK'.

In comparison with the scenario of vehicle 125 having a continuous velocity of 50 km/h, as shown in TABLE 1, TABLE 2 presents a scenario where the driver of vehicle 125 notices the pedestrian 120 and accordingly slows down to avoid an accident.

TABLE 2

RISK OF COLLISION BETWEEN A VEHICLE AND A PEDESTRIAN FOR RESPECTIVE TIMES AND DISTANCES WHEN THE VEHICLE IS BRAKING. (AV = vehicle 102 and V2 = vehicle 125)

| | Time since pedestrian has been detected (seconds) | Distance from V2 to pedestrian crossing | V2 real time speed (km/h) | Time needed so V2 reaches pedestrian crossing | Minimum distance needed for V2 to brake and not hit the pedestrian | AV's Assessment |
|---|---|---|---|---|---|---|
| N | 0 | 100 meters | 50 | 7 seconds | 35 meters | SAFE: Enough time to brake and pedestrian is not in V2's lane |
| O | 1 | 86 meters | 50 | 6.5 seconds | 35 meters | SAFE |
| P | 2 | 75 meters | 40 | 6.5 seconds | 25 meters | SAFE |

TABLE 2-continued

RISK OF COLLISION BETWEEN A VEHICLE AND A PEDESTRIAN
FOR RESPECTIVE TIMES AND DISTANCES WHEN THE VEHICLE
IS BRAKING. (AV = vehicle 102 and V2 = vehicle 125)

| | Time since pedestrian has been detected (seconds) | Distance from V2 to pedestrian crossing | V2 real time speed (km/h) | Time needed so V2 reaches pedestrian crossing | Minimum distance needed for V2 to brake and not hit the pedestrian | AV's Assessment |
|---|---|---|---|---|---|---|
| Q | 3 | 67 meters | 30 | 8 seconds | 20 meters | SAFE |
| R | 4 | 59 meters | 30 | 7 seconds | 20 meters | SAFE |
| S | 5 | 51 meters | 30 | 6 seconds | 20 meters | SAFE |
| T | 6 | 43 meters | 30 | 5 seconds | 20 meters | SAFE |
| U | 7 | 35 meters | 25 | 5 seconds | 15 meters | SAFE |
| V | 8 | 30 meters | 20 | 5 seconds | 10 meters | SAFE |
| W | 9 | 25 meters | 20 | 4.5 seconds | 10 meters | SAFE |
| X | 10 | 20 meters | 20 | 3.5 seconds | 10 meters | PEDESTRIAN HAS CROSSED. END PROCESS |

TABLE 2 presents various stages in an analysis process that can be undertaken (e.g., by accident component 165) while determining whether a collision will occur between a pedestrian 120 and a vehicle 125, along with various risk assessments of the collision occurring. TABLE 2 can be read in conjunction with other figures presented herein, particularly FIGS. 4 and 5. A sequence of eleven moments in time (N) to (X) are presented in TABLE 2, corresponding to the 10 seconds it takes the pedestrian 120 to traverse the crosswalk 210 depicted in FIG. 4, and the 10 seconds of vehicle 125's motion towards to crosswalk 210.

The circumstances of the initial moment (N) in the TABLE 2 are the same as the initial moment (A) in TABLE 1, at 0 seconds the pedestrian 120 has been detected by vehicle 102, vehicle 125 has been detected by vehicle 102 in LANE 1 at 100 metres (328 feet) from the crosswalk 210 while travelling with a velocity of 50 kmph (30 mph). However, in TABLE 2, the driver of vehicle 125 notices the pedestrian 120 at moment (O) and begins to decelerate vehicle 125. Accordingly, the risk assessment (e.g., by accident component 165) remains at SAFE as the pedestrian 120 is determined to never be in danger, during crossing of crosswalk 210, of being hit by vehicle 125.

Figure 9:
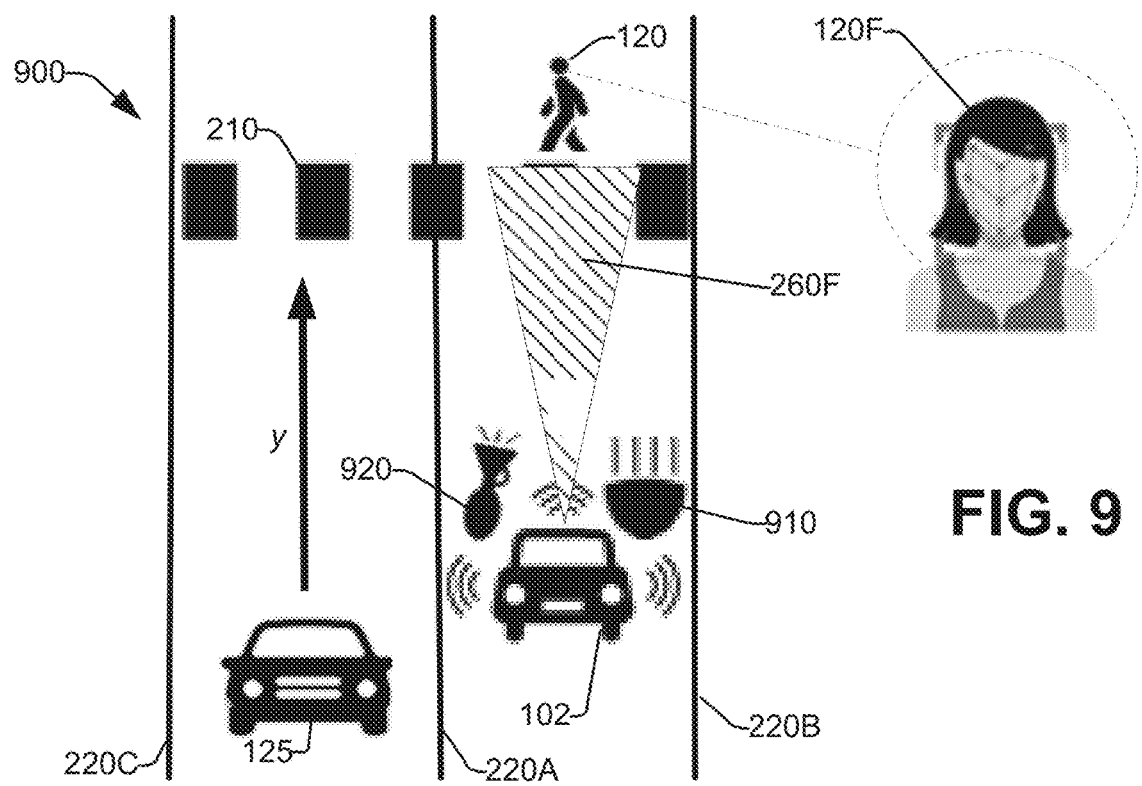
FIG. 9 is a schematic illustrating an AV attempting to determine whether a pedestrian is attentive to their surroundings based upon where they are currently looking, in accordance with various embodiments.

FIG. 9, schematic 900, illustrates an autonomous vehicle attempting to determine whether a pedestrian is attentive to their surroundings based upon where they are currently looking, in accordance with various embodiments. In an embodiment, pedestrian component 158 can utilize a camera 150A on vehicle 102 to capture imagery regarding the pedestrian 120. The pedestrian component 158 can further utilize a computer vision algorithm 164F which has been configured to identify and extract the face 120F of pedestrian 120 from the digital imagery captured by camera 150A. In an event that the face 120F cannot be fully identified and/or detected by the algorithm 164F (e.g., the pedestrian is not looking ahead in their direction of travel or looking in the direction of oncoming vehicle 125) the pedestrian component 158 can inform the accident component 165 that the face 120F cannot be resolved and, accordingly, it may be inferred that the person 120 is not paying attention the conditions of road 205, and further, the pedestrian 120 is looking at their cellphone, or suchlike.

Per the foregoing, the accident component 165 can make a determination that an accident may occur if the pedestrian 120 remains inattentive to the conditions of road 205. Hence, to prevent the accident, the accident component 165 can instruct the warning component 168 to activate flashing of the headlights 910 and/or operate the car horn 920 via the devices component 149. In a further embodiment, the devices component 149 can maintain flashing of the headlights 910 and/or operation of the car horn 920 until the face 120F is detected (e.g., the pedestrian 120 looks at vehicle 102) and/or the accident component 165 determines that the pedestrian 120 is in a safe situation (e.g., the vehicle 125 has slowed down for pedestrian 120 to cross the road 205 safely, the pedestrian 120 has waited for vehicle 125 to drive through the crosswalk 210 in LANE 2 before continuing to cross, the pedestrian 120 has walked faster to reach side 220C of road 205, and suchlike).

Figure 10:
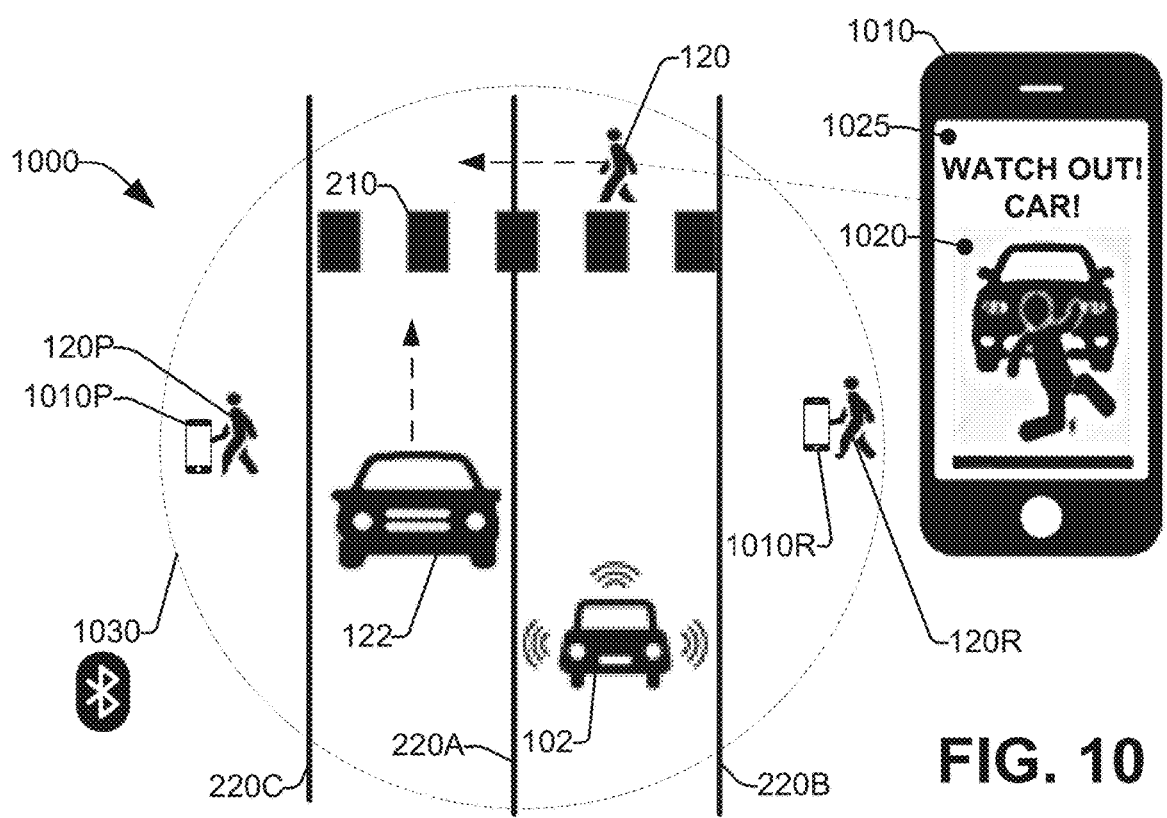
FIG. 10 is a schematic illustrating an autonomous vehicle attempting to warn a pedestrian of them potentially involved in an accident, in accordance with at least one embodiment.

FIG. 10, schematic 1000, illustrates an autonomous vehicle attempting to warn a pedestrian of them potentially being involved in an accident, in accordance with at least one embodiment. As shown in FIG. 10, vehicle 102 can attempt to notify the pedestrian 120 of the potential accident by communicating with the pedestrian 120 via the pedestrian's cellphone 1010. In an example scenario, the pedestrian 120 may be viewing their cellphone 1010 while engaging in social media, sending an email, listening to music, a podcast, watching a video, and suchlike, and accordingly, the pedestrian 120 may not hear the car horn 920 or see the headlights 910 (per FIG. 9). Hence, the vehicle 102 can send a warning notification to the cellphone 1010, where the cellphone 1010 is configured to present a warning screen 1020 "WATCH OUT! CAR!" on the display 1025 of the cellphone 1010. The cellphone 1010 can be configured such that the warning screen 1020 is also combined with an audible alarm such that the warning screen 1020 interrupts whatever content may be being presented on display 1025 in conjunction with an audible alarm being generated from a speaker on the cellphone 1010 or via headphones connected to the cellphone.

Any suitable communication technology can be utilized to transmit the warning signal. In the example shown in FIG. 10, a warning signal 1030 is being transmitted via BLUETOOTH®. In an embodiment, generation of the warning signal 1030 can be such that the warning signal 1030 is directed towards the pedestrian of interest. For example, as shown in FIG. 10, more than one pedestrian can be in the vicinity of the vehicle 105, such as pedestrians 120, 120P, and 120R. To prevent pedestrians (e.g., pedestrians 120P and 120R) from unduly receiving warning notifications (e.g., warning screen 1020) on their own portable devices, advantage can be taken of the location knowledge (e.g., via GPS) of the portable device they may be carrying. For example, pedestrians 120P and 120R are respectively carrying devices 1010P and 1010R.

As shown in TABLE 3, devices 1010, 1010P, and 1010R can be configured with onboard software/components that in response to receiving the warning signal 1030, the onboard software can run a self analysis check comprising essentially of (a) is device (e.g., any of devices 1010, 1010P, or 1010R) located on/or near the road 205?, (b) is the device active? (e.g., is the device playing music? is the screen on?), and, in the event of both (a) and (b) being YES, (c) notification to be presented?

TABLE 3

DETERMINATION OF WHETHER PORTABLE DEVICE SHOULD PRESENT WARNING NOTIFICATION.

| Person | Crossing the Road? | Is Device active/screen on? | Notification? |
|---|---|---|---|
| Pedestrian 120 | YES | YES | YES |
| Pedestrian 120P | NO | — | NO |
| Pedestrian 120R | NO | — | NO |

Figure 11:
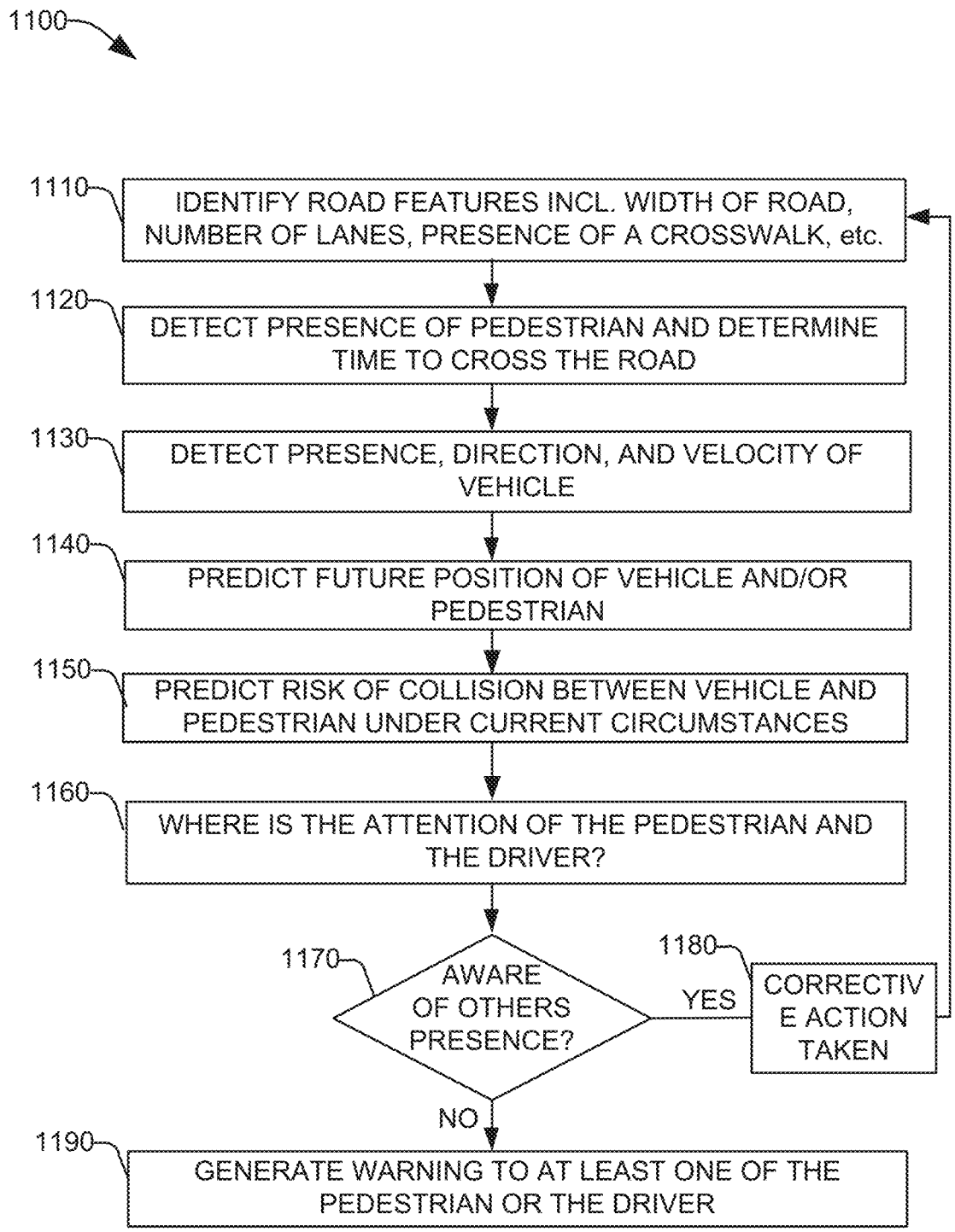
FIG. 11 illustrates a flow diagram for a computer-implemented methodology for a vehicle being operated autonomously to prevent an accident between a pedestrian and a nearby vehicle, in accordance with at least one embodiment.

FIG. 11 illustrates a flow diagram 1100 for a computer-implemented methodology for a vehicle being operated autonomously to prevent an accident between a pedestrian and a nearby vehicle, in accordance with at least one embodiment.

At 1110, an AV (e.g., vehicle 102, a first vehicle) can gather information regarding a road (e.g., road 205) being driven by the AV, wherein the AV can receive information (e.g., digital imagery, data) from one or more devices, cameras, sensors, etc. (e.g., sensors/cameras 150A-n) and process the information (e.g., by road component 160 in conjunction with one or more algorithms 164A-n) to identify any of lane markings (e.g., 220), crosswalks (e.g., 210), and suchlike. From the information captured from the surface of the road, features such as the width of the road, number of lanes, etc., can be determined (e.g., by road component 160). Further, from the information captured from the surface of the road, the presence of a crosswalk (e.g., crosswalk 210) and the width of the crosswalk can be identified (e.g., by road component 160).

At 1120, further, from the gathered information, a pedestrian (e.g., pedestrian 120) can be identified (e.g., by pedestrian component 158) crossing or about to cross the road via a crosswalk or a random location on the road. Furthermore, the direction and/or speed of motion of the pedestrian can be determined from which it can be established how long it will take for the pedestrian to cross the road. Also, the focus of attention of the pedestrian can be determined, e.g., is the pedestrian observing their surroundings, traffic, the road, and suchlike, or is the attention of the pedestrian distracted by a cellphone or other distraction? A facial recognition-type algorithm (e.g., in algorithms 164A-n) can be utilized to determine whether the pedestrian is engaged with their surroundings or their attention is on the cellphone.

At 1130, from the gathered information, a nearby vehicle (e.g., vehicle 125, a second vehicle) can be identified, e.g., in an adjacent lane (e.g., LANE 2) to the AV (which can be located in LANE 1). Further, the direction of motion and/or velocity of the nearby vehicle can be determined (e.g., by vehicle detection component 163).

At 1140, based on respective factors such as the direction of motion and velocity of the nearby vehicle and the pedestrian, predictions can be made regarding respective future locations of the pedestrian and the vehicle (e.g., by any combination of pedestrian component 158, vehicle detection component 163, and/or accident component 165).

At 1150, based on the respectively determined current and future locations of the nearby vehicle and the pedestrian, a risk of collision between the pedestrian and the nearby vehicle can be determined (e.g., by accident component 165). As previously described (per TABLES 1 and 2) different levels of risk can be assessed: SAFE (NO RISK) when the locations, distances, velocities of the pedestrian and nearby vehicle indicates zero likelihood of collision; MODERATE whereby the pedestrian is entering a situation of potential collision but the opportunity still exists for averting action (e.g., nearby vehicle brakes, pedestrian hurries through crosswalk, and suchlike); HIGH is where the respective velocities, positions, etc., indicate that a collision has a high probability of occurring.

At 1160, a determination can be made (e.g., by any combination of pedestrian component 158, vehicle detection component 163, and/or accident component 165) regarding the respective focus/distraction of the driver of the nearby vehicle and the pedestrian. E.g., is the pedestrian looking at their cellphone? Is the driver distracted by an onboard display on the vehicle?

At 1170, a determination can be made as to whether the pedestrian and the driver are aware of each other's presence. In the event of YES, methodology 1100 can advance to 1180, corrective action is taken, wherein, for example, the driver sees the pedestrian and the vehicle is slowing, the risk can reduce from MODERATE to SAFE, and the accident has been averted. The methodology 1100 can return to 1110 for the next potential interaction between a vehicle and a pedestrian.

At 1170, in the event of NO, neither the driver has seen the pedestrian or the pedestrian has seen the driver, the methodology 1100 can advance to 1190, wherein a warning (e.g., by warning component 168) can be generated for one or both of the pedestrian or the driver. As previously described, the warning can entail activation of a car horn, flashing headlights, warning signal transmitted to a phone, etc., (e.g., by warning component 168 in conjunction with devices component 149 or via communication component 170 and I/O component 116). The warning can be continued until attention of the pedestrian or the driver is obtained.

Figure 12:
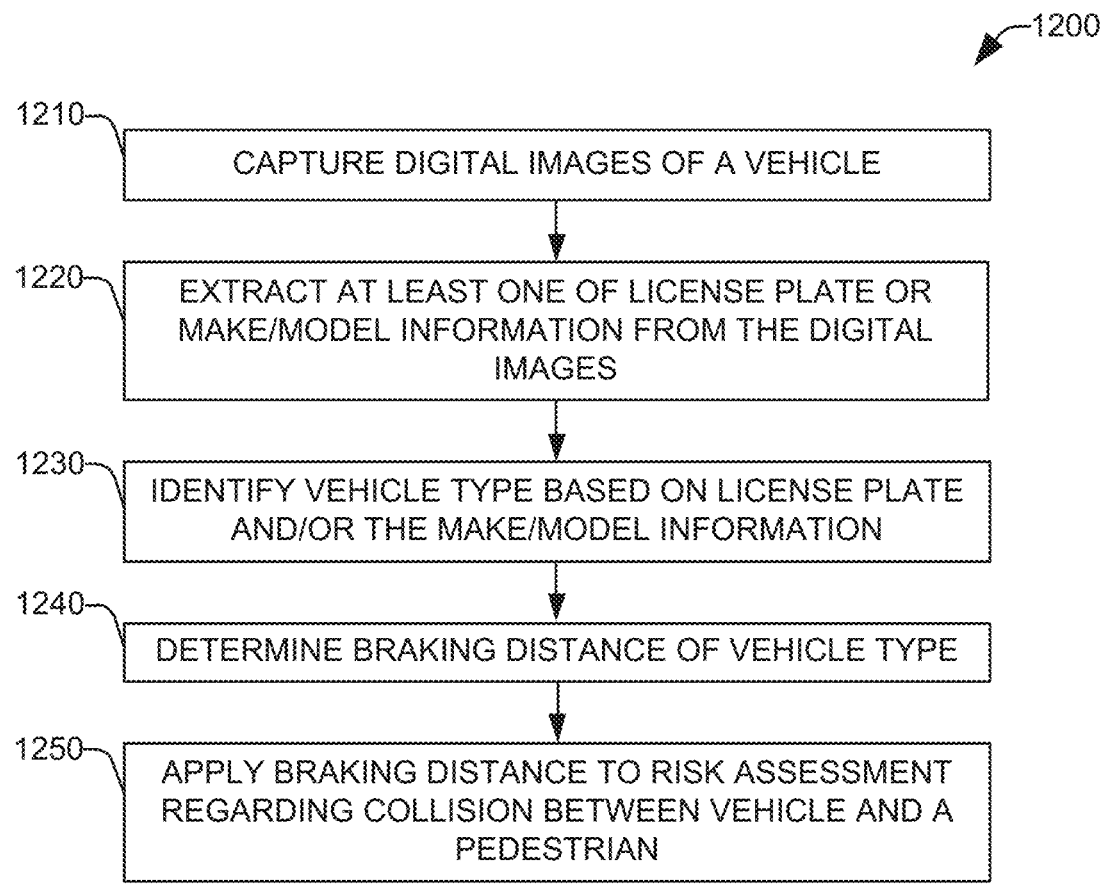
FIG. 12, illustrates a flow diagram for a computer-implemented methodology for determining a vehicle type based upon information extracted from an image captured of the vehicle. a vehicle being operated autonomously to prevent an accident between a pedestrian and a nearby vehicle, in accordance with at least one embodiment.

FIG. 12, illustrates a flow diagram 1200 for a computer-implemented methodology for determining a vehicle type based upon information extracted from an image captured of the vehicle by a vehicle being operated autonomously to prevent an accident between a pedestrian and a nearby vehicle, in accordance with at least one embodiment.

At 1210, an AV (e.g., vehicle 102, a first vehicle) can capture digital images (or similar artifacts) of a nearby vehicle (e.g., vehicle 125, a second vehicle, nearby vehicle), wherein the digital images can be obtained by one or more devices, cameras, sensors, etc. (e.g., sensors/cameras 150A-n) located on the AV.

At 1220, the images can be processed (e.g., by vehicle detection component 163 in conjunction with one or more algorithms 164A-n) to identify at least one of a license plate (e.g., license plate 720), make/model (e.g., make/model 710), and/or dimensions (e.g., dimensions 760, VH, W) of the nearby vehicle.

At 1230, the vehicle type can be identified (e.g., by vehicle detection component 163) based upon any of the license plate, make/model information, dimensions (e.g., where VH, W indicate the nearby vehicle to be a small sized car, medium sized car, large car, SUV, pick-up truck, a truck, and suchlike). In an embodiment, the license plate information can be applied to a database (e.g., vehicle database 180) whereupon the vehicle type can be found in the database based on the license plate information.

At 1240, with the vehicle type information identified, the braking distance of the vehicle can be determined for a current velocity of the nearby vehicle (e.g., per FIG. 8), with account being taken of current road conditions (e.g., wet road surface, dry road surface, daylight conditions=better visibility, nighttime=worse visibility and slower reaction time).

At 1250, the identified braking distance for the nearby vehicle can be applied to the risk assessment (e.g., by accident component 165) to determine whether the nearby vehicle is going to collide with a pedestrian (e.g., pedestrian 120) crossing a road (e.g., road 205).

Figure 13:
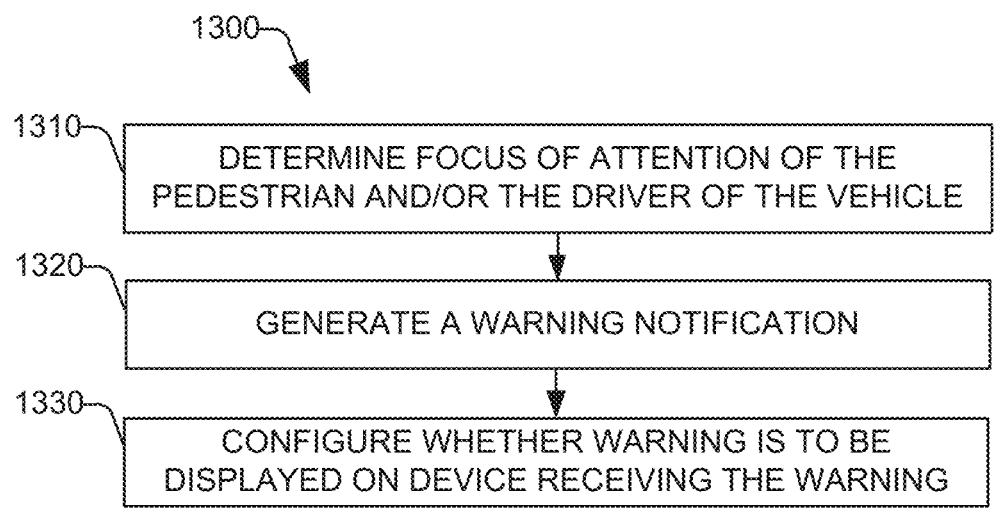
FIG. 13, illustrates a flow diagram for a computer-implemented methodology for presenting a warning notification on a device being carried by a pedestrian or located in a vehicle, in accordance with at least one embodiment.

FIG. 13, illustrates a flow diagram 1300 for a computer-implemented methodology for presenting a warning notification on a device being carried by a pedestrian or located in a vehicle, in accordance with at least one embodiment.

At 1310, an AV (e.g., vehicle 102, a first vehicle) can capture digital images (or similar artifacts) of a nearby vehicle (e.g., vehicle 125, a second vehicle), wherein the digital images can be obtained by one or more devices, cameras, sensors, etc. (e.g., sensors/cameras 150A-n) located on the AV. Digital images can also be captured from a pedestrian (e.g., pedestrian 120) using the sensors, cameras, etc. Respective determinations can be made regarding the focus of attention of a driver of the nearby vehicle (e.g., by vehicle detection component 163 in conjunction with algorithms 164A-n) and that of the pedestrian (e.g., by pedestrian component 158 in conjunction with algorithms 164A-n).

At 1320, in response to determining that either of the driver or the pedestrian are not focused on their surroundings but rather distracted (e.g., by a cellphone) a warning notification can be sent (e.g., by warning component 168, communication component 170, and/or I/O 116) to an external device (e.g., cellphone 1010).

At 1330, the external device can run through a sequence to determine whether the warning notification (e.g., warning 1020) is to be presented (e.g., on screen 1025) of the external device. Software, executable by a processor on the external device, can make a determination as to whether the pedestrian is near the road (e.g., road 205), the external device is being actively used by the pedestrian, and, if so, should the warning notification be presented.

EXAMPLE APPLICATIONS AND USE

Figure 14:
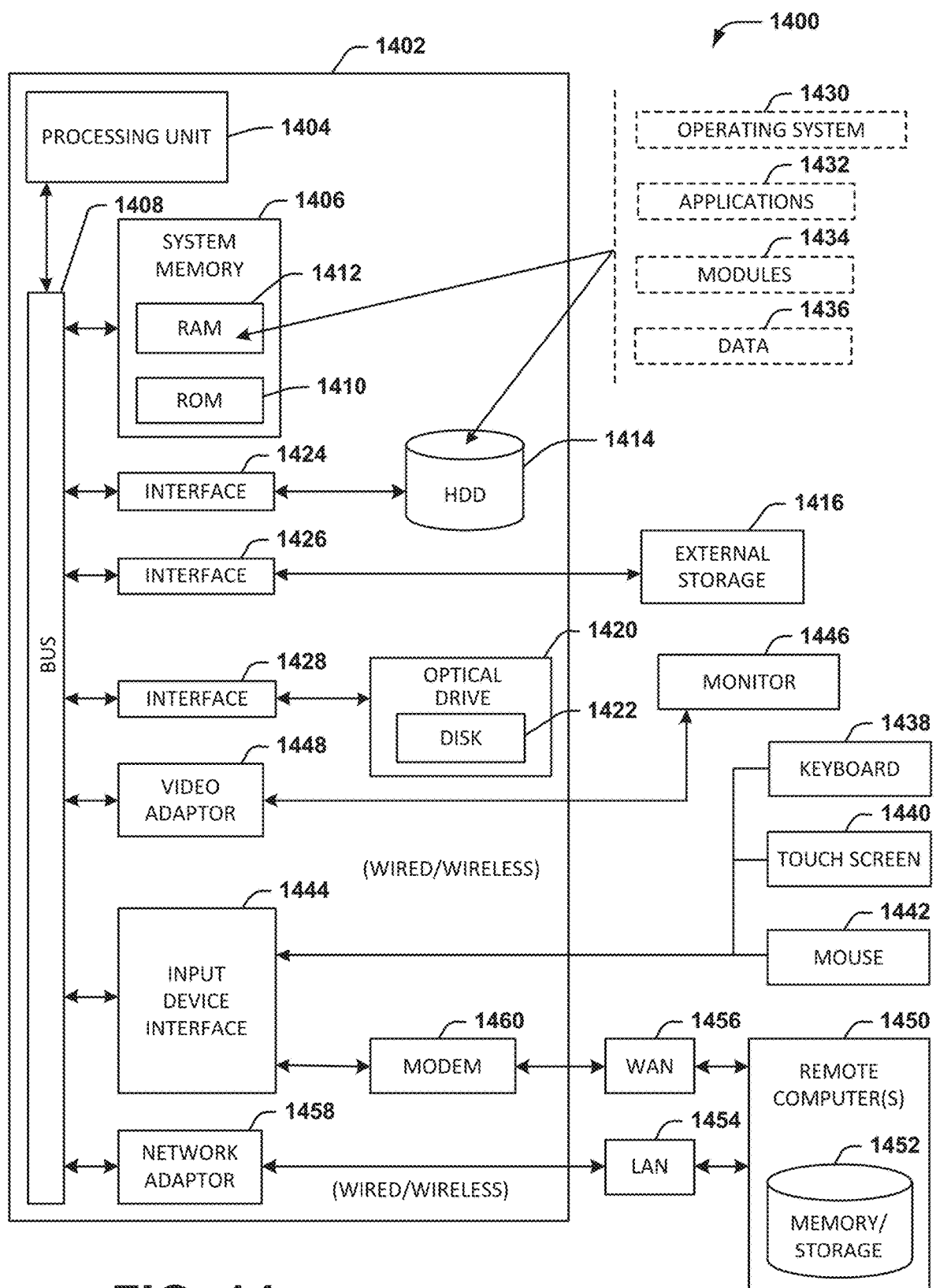
FIG. 14 is a block diagram illustrating an example computing environment in which the various embodiments described herein can be implemented.
Figure 15:
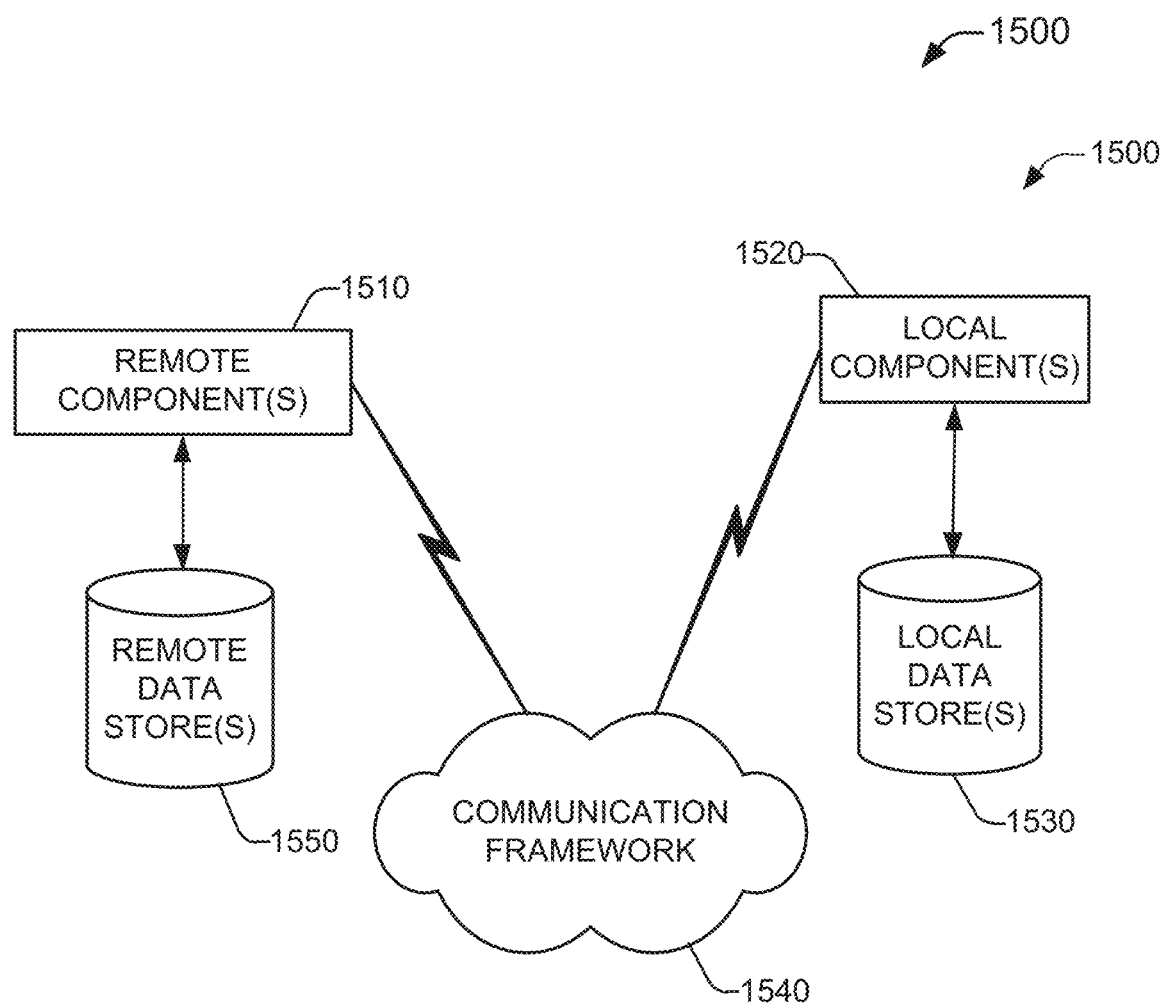
FIG. 15 is a block diagram illustrating an example computing environment with which the disclosed subject matter can interact, in accordance with an embodiment.

Turning next to FIGS. 14 and 15, a detailed description is provided of additional context for the one or more embodiments described herein with FIGS. 1-13.

In order to provide additional context for various embodiments described herein, FIG. 14 and the following discussion are intended to provide a brief, general description of a suitable computing environment 1400 in which the various embodiments described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, IoT devices, distributed computing systems, as well as personal computers, hand-held computing devices, microprocessor-based or programmable consumer electronics, and the like, each of which can be operatively coupled to one or more associated devices.

The embodiments illustrated herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 14, the example environment 1400 for implementing various embodiments of the aspects described herein includes a computer 1402, the computer 1402 including a processing unit 1404, a system memory 1406 and a system bus 1408. The system bus 1408 couples system components including, but not limited to, the system memory 1406 to the processing unit 1404. The processing unit 1404 can be any of various commercially available processors and may include a cache memory. Dual microprocessors and other multi-processor architectures can also be employed as the processing unit 1404.

The system bus 1408 can be any of several types of bus structure that can further interconnect to a memory bus (with or without a memory controller), a peripheral bus, and a local bus using any of a variety of commercially available bus architectures. The system memory 1406 includes ROM 1410 and RAM 1412. A basic input/output system (BIOS) can be stored in a non-volatile memory such as ROM, erasable programmable read only memory (EPROM), EEPROM, which BIOS contains the basic routines that help to transfer information between elements within the computer 1402, such as during startup. The RAM 1412 can also include a high-speed RAM such as static RAM for caching data.

The computer 1402 further includes an internal hard disk drive (HDD) 1414 (e.g., EIDE, SATA), one or more external storage devices 1416 (e.g., a magnetic floppy disk drive (FDD) 1416, a memory stick or flash drive reader, a memory card reader, etc.) and an optical disk drive 1420 (e.g., which can read or write from a CD-ROM disc, a DVD, a BD, etc.). While the internal HDD 1414 is illustrated as located within the computer 1402, the internal HDD 1414 can also be configured for external use in a suitable chassis (not shown). Additionally, while not shown in environment 1400, a solid-state drive (SSD) could be used in addition to, or in place of, an HDD 1414. The HDD 1414, external storage device(s) 1416 and optical disk drive 1420 can be connected to the system bus 1408 by an HDD interface 1424, an external storage interface 1426 and an optical drive interface 1428, respectively. The interface 1424 for external drive implementations can include at least one or both of Universal Serial Bus (USB) and Institute of Electrical and Electronics Engineers (IEEE) 1494 interface technologies. Other external drive connection technologies are within contemplation of the embodiments described herein.

The drives and their associated computer-readable storage media provide nonvolatile storage of data, data structures, computer-executable instructions, and so forth. For the computer 1402, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1412, including an operating system 1430, one or more application programs 1432, other program modules 1434 and program data 1436. All or portions of the operating system, applications, modules, and/or data can also be cached in the RAM 1412. The systems and methods described herein can be implemented utilizing various commercially available operating systems or combinations of operating systems.

Computer 1402 can optionally comprise emulation technologies. For example, a hypervisor (not shown) or other intermediary can emulate a hardware environment for operating system 1430, and the emulated hardware can optionally be different from the hardware illustrated in FIG. 14. In such an embodiment, operating system 1430 can comprise one virtual machine (VM) of multiple VMs hosted at computer 1402. Furthermore, operating system 1430 can provide runtime environments, such as the Java runtime environment or the .NET framework, for applications 1432. Runtime environments are consistent execution environments that allow applications 1432 to run on any operating system that includes the runtime environment. Similarly, operating system 1430 can support containers, and applications 1432 can be in the form of containers, which are lightweight, standalone, executable packages of software that include, e.g., code, runtime, system tools, system libraries and settings for an application.

Further, computer 1402 can comprise a security module, such as a trusted processing module (TPM). For instance with a TPM, boot components hash next in time boot components, and wait for a match of results to secured values, before loading a next boot component. This process can take place at any layer in the code execution stack of computer 1402, e.g., applied at the application execution level or at the operating system (OS) kernel level, thereby enabling security at any level of code execution.

A user can enter commands and information into the computer 1402 through one or more wired/wireless input devices, e.g., a keyboard 1438, a touch screen 1440, and a pointing device, such as a mouse 1442. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1404 through an input device interface 1444 that can be coupled to the system bus 1408, but can be connected by other interfaces, such as a parallel port, an IEEE 1494 serial port, a game port, a USB port, an IR interface, a BLUETOOTH® interface, etc.

A monitor 1446 or other type of display device can be also connected to the system bus 1408 via an interface, such as a video adapter 1448. In addition to the monitor 1446, a computer typically includes other peripheral output devices (not shown), such as speakers, printers, etc.

The computer 1402 can operate in a networked environment using logical connections via wired and/or wireless communications to one or more remote computers, such as a remote computer(s) 1450. The remote computer(s) 1450 can be a workstation, a server computer, a router, a personal computer, portable computer, microprocessor-based entertainment appliance, a peer device or other common network node, and typically includes many or all of the elements described relative to the computer 1402, although, for purposes of brevity, only a memory/storage device 1452 is illustrated. The logical connections depicted include wired/wireless connectivity to a local area network (LAN) 1454 and/or larger networks, e.g., a wide area network (WAN) 1456. Such LAN and WAN networking environments are commonplace in offices and companies, and facilitate enterprise-wide computer networks, such as intranets, all of which can connect to a global communications network, e.g., the internet.

When used in a LAN networking environment, the computer 1402 can be connected to the local network 1454 through a wired and/or wireless communication network interface or adapter 1458. The adapter 1458 can facilitate wired or wireless communication to the LAN 1454, which can also include a wireless access point (AP) disposed thereon for communicating with the adapter 1458 in a wireless mode.

When used in a WAN networking environment, the computer 1402 can include a modem 1460 or can be connected to a communications server on the WAN 1456 via other means for establishing communications over the WAN 1456, such as by way of the internet. The modem 1460, which can be internal or external and a wired or wireless device, can be connected to the system bus 1408 via the input device interface 1444. In a networked environment, program modules depicted relative to the computer 1402 or portions thereof, can be stored in the remote memory/storage device 1452. It will be appreciated that the network connections shown are example and other means of establishing a communications link between the computers can be used.

When used in either a LAN or WAN networking environment, the computer 1402 can access cloud storage systems or other network-based storage systems in addition to, or in place of, external storage devices 1416 as described above. Generally, a connection between the computer 1402 and a cloud storage system can be established over a LAN 1454 or WAN 1456 e.g., by the adapter 1458 or modem 1460, respectively. Upon connecting the computer 1402 to an associated cloud storage system, the external storage interface 1426 can, with the aid of the adapter 1458 and/or modem 1460, manage storage provided by the cloud storage system as it would other types of external storage. For instance, the external storage interface 1426 can be configured to provide access to cloud storage sources as if those sources were physically connected to the computer 1402.

The computer 1402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description includes non-limiting examples of the various embodiments. It is, of course, not possible to describe every conceivable combination of components or methodologies for purposes of describing the disclosed subject matter, and one skilled in the art may recognize that further combinations and permutations of the various embodiments are possible. The disclosed subject matter is intended to embrace all such alterations, modifications, and variations that fall within the spirit and scope of the appended claims.

Referring now to details of one or more elements illustrated at FIG. 15, an illustrative cloud computing environment 1500 is depicted. FIG. 15 is a schematic block diagram of a computing environment 1500 with which the disclosed subject matter can interact. The system 1500 comprises one or more remote component(s) 1510. The remote component(s) 1510 can be hardware and/or software (e.g., threads, processes, computing devices). In some embodiments, remote component(s) 1510 can be a distributed computer system, connected to a local automatic scaling component and/or programs that use the resources of a distributed computer system, via communication framework 1540. Communication framework 1540 can comprise wired network devices, wireless network devices, mobile devices, wearable devices, radio access network devices, gateway devices, femtocell devices, servers, etc.

The system 1500 also comprises one or more local component(s) 1520. The local component(s) 1520 can be hardware and/or software (e.g., threads, processes, computing devices). In some embodiments, local component(s) 1520 can comprise an automatic scaling component and/or programs that communicate/use the remote resources 1510 and 1520, etc., connected to a remotely located distributed computing system via communication framework 1540.

One possible communication between a remote component(s) 1510 and a local component(s) 1520 can be in the form of a data packet adapted to be transmitted between two or more computer processes. Another possible communication between a remote component(s) 1510 and a local component(s) 1520 can be in the form of circuit-switched data adapted to be transmitted between two or more computer processes in radio time slots. The system 1500 comprises a communication framework 1540 that can be employed to facilitate communications between the remote component(s) 1510 and the local component(s) 1520, and can comprise an air interface, e.g., Uu interface of a UMTS network, via a long-term evolution (LTE) network, etc. Remote component(s) 1510 can be operably connected to one or more remote data store(s) 1550, such as a hard drive, solid state drive, SIM card, device memory, etc., that can be employed to store information on the remote component(s) 1510 side of communication framework 1540. Similarly, local component(s) 1520 can be operably connected to one or more local data store(s) 1530, that can be employed to store information on the local component(s) 1520 side of communication framework 1540.

With regard to the various functions performed by the above described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" as used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

As used in this disclosure, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component can be, but is not limited to being, a process running on a processor, a processor, an object, an executable, a thread of execution, computer-executable instructions, a program, and/or a computer. By way of illustration and not limitation, both an application running on a server and the server can be a component.

One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

The term "facilitate" as used herein is in the context of a system, device or component "facilitating" one or more actions or operations, in respect of the nature of complex computing environments in which multiple components and/or multiple devices can be involved in some computing operations. Non-limiting examples of actions that may or may not involve multiple components and/or multiple devices comprise transmitting or receiving data, establishing a connection between devices, determining intermediate results toward obtaining a result, etc. In this regard, a computing device or component can facilitate an operation by playing any part in accomplishing the operation. When operations of a component are described herein, it is thus to be understood that where the operations are described as facilitated by the component, the operations can be optionally completed with the cooperation of one or more other computing devices or components, such as, but not limited to, sensors, antennae, audio and/or visual output devices, other devices, etc.

Further, the various embodiments can be implemented as a method, apparatus or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can comprise, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

Moreover, terms such as "mobile device equipment," "mobile station," "mobile," "subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," "BS transceiver," "BS device," "cell site," "cell site device," "gNode B (gNB)," "evolved Node B (eNode B, eNB)," "home Node B (HNB)" and the like, refer to wireless network components or appliances that transmit and/or receive data, control, voice, video, sound, gaming or substantially any data-stream or signaling-stream from one or more subscriber stations. Data and signaling streams can be packetized or frame-based flows.

Furthermore, the terms "device," "communication device," "mobile device," "subscriber," "client entity," "consumer," "client entity," "entity" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

It should be noted that although various aspects and embodiments are described herein in the context of 5G or other next generation networks, the disclosed aspects are not limited to a 5G implementation, and can be applied in other network next generation implementations, such as sixth generation (6G), or other wireless systems. In this regard, aspects or features of the disclosed embodiments can be exploited in substantially any wireless communication technology. Such wireless communication technologies can include universal mobile telecommunications system (UMTS), global system for mobile communication (GSM), code division multiple access (CDMA), wideband CDMA (WCMDA), CDMA2000, time division multiple access (TDMA), frequency division multiple access (FDMA), multi-carrier CDMA (MC-CDMA), single-carrier CDMA (SC-CDMA), single-carrier FDMA (SC-FDMA), orthogonal frequency division multiplexing (OFDM), discrete Fourier transform spread OFDM (DFT-spread OFDM), filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM (CP-OFDM), resource-block-filtered OFDM, wireless fidelity (Wi-Fi), worldwide interoperability for microwave access (WiMAX), wireless local area network (WLAN), general packet radio service (GPRS), enhanced GPRS, third generation partnership project (3GPP), long term evolution (LTE), 5G, third generation partnership project 2 (3GPP2), ultra-mobile broadband (UMB), high speed packet access (HSPA), evolved high speed packet access (HSPA+), high-speed downlink packet access (HSDPA), high-speed uplink packet access (HSUPA), Zigbee, or another institute of electrical and electronics engineers (IEEE) 802.12 technology.

While not an exhaustive listing, summarizing various embodiments, but not all embodiments, presented herein:

1. A system, located on a first vehicle operating at least partially autonomously, comprising: a memory that stores computer executable components; and a processor that executes the computer executable components stored in the memory, wherein the computer executable components comprise: an accident component configured to: determine whether a second vehicle driving along a road will collide with a pedestrian crossing the road; and in response to determining that, under current operation, the second vehicle will collide with the pedestrian, initiating a notification to achieve at least one of attention of the pedestrian or attention of a driver of the second vehicle to prevent the collision from occurring.
2. The system of claim 1, further comprising: a pedestrian component configured to: detect the pedestrian crossing the road; and determine at least one of a direction of travel of the pedestrian, a speed of motion of the pedestrian, a direction the pedestrian is viewing, or a focus of attention of the pedestrian.
3. The system of claim 1, further comprising: a vehicle detection component configured to: detect the second vehicle driving along the road; and determine at least one of a direction of travel of the second vehicle, a velocity of the second vehicle, a vehicle type for the second vehicle, or a focus of attention of the driver of the second vehicle.
4. The system of claim 1, further comprising: a road component configured to: detect at least one of a crosswalk or line markings indicating a lane on the road.
5. The system of claim 1, further comprising: a warning component configured to: receive the notification; and in response to receiving the notification, activating operation of at least one on-board device, wherein the at least one on-board device is a car horn or headlights.
6. The system of any preceding clause, wherein the warning component is further configured to initiate transmission of a warning notification to at least one remote device, wherein the at least one remote device is a device located on-board the second vehicle or a portable device being conveyed by the pedestrian.
7. The system of any preceding clause, wherein the portable device is one of a mobile device, a cellular phone, a laptop, a tablet pc, a wearable computing device, or an internet of things (IoT) device.
8. The system of claim 1, further comprising: a camera configured to provide imagery of the pedestrian; and an algorithm configured to determine a current focus of attention of the pedestrian, wherein the determination is based upon identifying the face of the pedestrian in the imagery captured of the pedestrian by the camera.
9. The system of claim 1, further comprising: a camera configured to provide imagery of the second vehicle; and an algorithm configured to extract at least one of a license plate of the second vehicle, a manufacturer of the second vehicle, a model type of the second vehicle, a height of a structure on the second vehicle, a width of the second vehicle, or an axle width of the second vehicle.
10. The system of any preceding clause, further comprising: an onboard vehicle database comprising license plates associated with manufacturers and models of vehicles; and a vehicle detection component configured: to identify the license plate in the vehicle database; determine the model type of the second vehicle based on a model type assigned to the license plate in the vehicle database; and determine at least one dimension of the second vehicle, wherein the at least one dimension is one of the height of the structure on the second vehicle, the width of the second vehicle, or the axle width of the second vehicle.
11. A method comprising: detecting, by a device comprising a processor located on a vehicle (AV) wherein the AV is operating at least in a partially autonomous manner, a presence of a pedestrian crossing a road being navigated by the AV and a presence of a second vehicle driving along the road towards the pedestrian; determining a possibility of the second vehicle colliding with the pedestrian; and in response to determining the second vehicle and the pedestrian will be at the same portion of the road at the same time, generating a warning to achieve the attention of at least one of the pedestrian or a driver of the second vehicle.
12. The method of claim 11, further comprising: analyzing digital images received at the AV to determine: the presence and motion of the pedestrian during a period of time; and the presence and motion of the second vehicle during the same period of time.
13. The method of claim 11, further comprising: detecting a crosswalk located on the road, wherein the pedestrian is crossing the road via the crosswalk.
14. The method of any preceding clause, further comprising: determining the width of the crosswalk; and determining whether the pedestrian can reach the end of the crosswalk safely in the event of a reduction in velocity of the second vehicle.
15. The method of claim 11, further comprising: determining a focus of attention of the pedestrian; and in response to determining the focus of attention is on a portable computing device, transmitting a warning to the portable computing device for presentment of the warning on the portable computing device.
16. The method of claim 11, further comprising: activating operation of at least one device located onboard the AV, wherein the at least one device is a car horn or flashing headlights.

17. A computer program product comprising a computer readable storage medium having program instructions embodied therewith, the program instructions executable by a processor to cause the processor to: monitor motion and direction of a pedestrian crossing a road being navigated by a first vehicle, wherein the processer is located on the first vehicle; monitor motion and direction of a second vehicle driving towards the pedestrian; and in response to determining a probability of the second vehicle colliding with the pedestrian, generate a warning to obtain attention of at least one of the pedestrian or a driver of the second vehicle regarding an imminent collision.

18. The computer program product of claim 17, wherein the program instructions are further executable by the processor to cause the processor to: analyze sensor information gathered by at least one sensor located on the first vehicle to: determine a trajectory of motion of the pedestrian and a trajectory of motion of the second vehicle; and determine whether the trajectory of motion of the pedestrian will intersect with the trajectory of motion of the second vehicle, wherein a determined intersection indicates a location at which the second vehicle collides with the pedestrian.

19. The computer program product of claim 17, wherein the warning is at least one of an audible alarm or a visual alarm, wherein the warning is generated by at least one of: a device located on the first vehicle; a portable device being carried by the pedestrian; or a device onboard the second vehicle.

20. The computer program product of claim 17, wherein the first vehicle is being operated in one of an autonomous, a partially autonomous, or a non-autonomous manner and the second vehicle is being operated in one of an autonomous, a partially autonomous, or a non-autonomous manner.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A system, located on a first vehicle operating at least partially autonomously, comprising:
    a camera configured to provide imagery of a pedestrian crossing a road;
    a memory that stores computer executable components; and
    a processor that executes the computer executable components stored in the memory, wherein the computer executable components comprise:
        an accident avoidance component configured to:
            determine a current focus of attention of the pedestrian, wherein the determination is based upon identifying a face of the pedestrian in the imagery captured of the pedestrian by the camera;
            determine whether a second vehicle driving along the road will collide with the pedestrian crossing the road based at least on the current focus of attention of the pedestrian; and
            in response to determining that, under current operation, the second vehicle will collide with the pedestrian, initiating a notification to achieve at least one of attention of the pedestrian or attention of a driver of the second vehicle to prevent the collision with the pedestrian from occurring.

2. The system of claim 1, further comprising:
a pedestrian component configured to:
    detect the pedestrian crossing the road; and
    determine at least one of a direction of travel of the pedestrian, a speed of motion of the pedestrian, or a direction the pedestrian is viewing.

3. The system of claim 1, further comprising:
a vehicle detection component configured to:
    detect the second vehicle driving along the road; and
    determine at least one of a direction of travel of the second vehicle, a velocity of the second vehicle, a vehicle type for the second vehicle, or a focus of attention of the driver of the second vehicle.

4. The system of claim 1, further comprising:
a road component configured to:
    detect at least one of a crosswalk or line markings indicating a lane on the road.

5. The system of claim 1, wherein initiating the notification comprises activating a car horn or headlights of the first vehicle.

6. The system of claim 5, wherein the accident avoidance component is further configured to initiate transmission of a warning notification to at least one remote device, wherein the at least one remote device is a device located on-board the second vehicle or a portable device being conveyed by the pedestrian.

7. The system of claim 6, wherein the portable device is one of a mobile device, a cellular phone, a laptop, a tablet pc, a wearable computing device, or an internet of things (IoT) device.

8. The system of claim 1, wherein the camera is further configured to provide imagery of the second vehicle, and wherein the accident avoidance component is further configured to extract at least one of a license plate of the second vehicle, a manufacturer of the second vehicle, a model type of the second vehicle, a height of a structure on the second vehicle, a width of the second vehicle, or an axle width of the second vehicle.

9. The system of claim 8, further comprising:
an onboard vehicle database comprising license plates associated with manufacturers and models of vehicles; and
a vehicle detection component configured:
    to identify the license plate in the onboard vehicle database;
    determine the model type of the second vehicle based on a model type assigned to the license plate in the onboard vehicle database; and
    determine at least one dimension of the second vehicle, wherein the at least one dimension is one of the height of the structure on the second vehicle, the width of the second vehicle, or the axle width of the second vehicle.

10. A method comprising:
  detecting, by a device comprising a processor located on a vehicle wherein the vehicle is operating at least in a partially autonomous manner, a presence of a pedestrian crossing a road being navigated by the vehicle and a presence of a second vehicle driving along the road towards the pedestrian;
  determining, by the device, a possibility of the second vehicle colliding with the pedestrian; and
  in response to determining the second vehicle and the pedestrian will be at the same portion of the road at the same time, generating, by the device, a warning to achieve attention of at least one of the pedestrian or a driver of the second vehicle, wherein generating the warning comprises:
    determining a focus of attention of the pedestrian; and
    in response to determining the focus of attention is on a portable computing device, transmitting a first warning to the portable computing device for presentment of the first warning on the portable computing device.

11. The method of claim 10, further comprising:
  analyzing, by the device, digital images received at the vehicle to determine:
    the presence and motion of the pedestrian during a period of time; and
    the presence and motion of the second vehicle during the period of time.

12. The method of claim 10, further comprising:
  detecting, by the device, a crosswalk located on the road, wherein the pedestrian is crossing the road via the crosswalk.

13. The method of claim 12, further comprising:
  determining, by the device, a width of the crosswalk; and
  determining, by the device, whether the pedestrian can reach an end of the crosswalk safely in response to a reduction in velocity of the second vehicle.

14. The method of claim 10, further comprising:
  activating, by the device, operation of at least one of a car horn or flashing headlights located onboard the vehicle.

15. A computer program product comprising a non-transitory computer readable medium having program instructions embodied therewith, the program instructions executable by a processor of a first vehicle to cause the processor to:
  monitor motion and direction of a pedestrian crossing a road being navigated by the first vehicle;
  monitor motion and direction of a second vehicle driving towards the pedestrian;
  detect a crosswalk located on the road, wherein the pedestrian is crossing the road via the crosswalk;
  determine a width of the crosswalk;
  determine a probability of the second vehicle colliding with the pedestrian, comprising:
    determining, based on the width of the crosswalk, whether the pedestrian can reach an end of the crosswalk safely in response to a reduction in velocity of the second vehicle; and
  in response to determining the probability of the second vehicle colliding with the pedestrian satisfies a defined criterion, generate a warning to obtain attention of at least one of the pedestrian or a driver of the second vehicle regarding an imminent collision.

16. The computer program product of claim 15, wherein the program instructions are further executable by the processor to cause the processor to:
  analyze sensor information gathered by at least one sensor located on the first vehicle to:
    determine a trajectory of motion of the pedestrian and a trajectory of the motion of the second vehicle; and
    determine whether the trajectory of the motion of the pedestrian will intersect with the trajectory of the motion of the second vehicle, wherein a determined intersection indicates a location at which the second vehicle will collide with the pedestrian.

17. The computer program product of claim 15, wherein the warning is at least one of an audible alarm or a visual alarm, wherein the warning is generated by at least one of:
  a device located on the first vehicle;
  a portable device being carried by the pedestrian; or
  a device onboard the second vehicle.

18. The computer program product of claim 15, wherein the first vehicle is being operated in one of an autonomous, a partially autonomous, or a non-autonomous manner, and the second vehicle is being operated in one of the autonomous, the partially autonomous, or the non-autonomous manner.

19. The computer program product of claim 17, wherein the portable device is one of a mobile device, a cellular phone, a laptop, a tablet pc, a wearable computing device, or an internet of things (IoT) device.

20. The computer program product of claim 15, wherein generating the warning comprises activating a car horn or headlights of the first vehicle.

* * * * *